(12) United States Patent
Kunigita et al.

(10) Patent No.: US 9,457,275 B2
(45) Date of Patent: Oct. 4, 2016

(54) INFORMATION PROCESSING DEVICE

(71) Applicant: Sony Computer Entertainment Inc., Tokyo (JP)

(72) Inventors: Hisayuki Kunigita, Kanagawa (JP); Jae-Hyun Park, Seoul (KR); Yeon-Sook Kim, Seoul (KR); Ju-Yeong Ji, Seoul (KR)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 13/937,672

(22) Filed: Jul. 9, 2013

(65) Prior Publication Data

US 2013/0293575 A1 Nov. 7, 2013

Related U.S. Application Data

(63) Continuation of application No. PCT/JP2011/005686, filed on Oct. 11, 2011.

(30) Foreign Application Priority Data

Jan. 14, 2011 (JP) .................................. 2011-006340

(51) Int. Cl.
*G09G 5/00* (2006.01)
*A63F 13/537* (2014.01)
(Continued)

(52) U.S. Cl.
CPC .............. *A63F 13/537* (2014.09); *A63F 13/52* (2014.09); *G09G 5/373* (2013.01); *G09G 5/377* (2013.01); *A63F 2300/305* (2013.01); *A63F 2300/308* (2013.01); *A63F 2300/572* (2013.01)

(58) Field of Classification Search
None
See application file for complete search history.

(56) References Cited

U.S. PATENT DOCUMENTS 6,563,999 B1 5/2003 Suzuoki
2003/0023374 A1* 1/2003 Shimabara .................... 701/212
(Continued)

FOREIGN PATENT DOCUMENTS

JP        5061405 A     3/1993
JP    2003004463 A     1/2003
(Continued)

OTHER PUBLICATIONS

International Search Report for corresponding PCT Application No. PCT/JP2011/005686, dated Nov. 8, 2011.
(Continued)

*Primary Examiner* — James A Thompson
*Assistant Examiner* — Xilin Guo
(74) *Attorney, Agent, or Firm* — Matthew B. Dernier, Esq

(57) ABSTRACT

A comment data acquisition unit acquires comment data for display over a display image, and a superimposition processing unit 162 generates a superimposition image from the comment data. The comment data includes a scaling factor or information related to the scaling factor, and a display requirement determination unit determines whether the scaling factor of the display image and either a scaling factor or information related to the scaling factor included in comment data are in a predetermined relationship. When the scaling factor of the display image and either the scaling factor or the information related to the scaling factor included in the comment data are in the predetermined relationship, a superimposition image generation unit generates a comment image using display information included in the comment data.

12 Claims, 19 Drawing Sheets

(51) Int. Cl.
*A63F 13/52* (2014.01)
*G09G 5/373* (2006.01)
*G09G 5/377* (2006.01)

(56) References Cited

U.S. PATENT DOCUMENTS

| | | | |
|---|---|---|---|
| 2007/0222798 A1* | 9/2007 | Kuno | 345/634 |
| 2008/0095452 A1* | 4/2008 | Berkner et al. | 382/240 |
| 2009/0296117 A1* | 12/2009 | Wada et al. | 358/1.9 |
| 2010/0002071 A1* | 1/2010 | Ahiska | 348/36 |
| 2010/0073487 A1* | 3/2010 | Sogoh et al. | 348/207.1 |
| 2010/0081416 A1* | 4/2010 | Cohen | 455/414.1 |
| 2010/0191728 A1* | 7/2010 | Reilly et al. | 707/736 |
| 2010/0201702 A1* | 8/2010 | Franik et al. | 345/589 |
| 2012/0206577 A1* | 8/2012 | Guckenberger et al. | 348/47 |

FOREIGN PATENT DOCUMENTS

| | | |
|---|---|---|
| JP | 2003283981 A | 10/2003 |
| JP | 2005300168 A | 10/2005 |
| JP | 2006276172 A | 10/2006 |
| JP | 2007151087 A | 6/2007 |
| JP | 2008305104 A | 12/2008 |
| JP | 2009049905 A | 3/2009 |
| JP | 2009134105 A | 6/2009 |

OTHER PUBLICATIONS

International Preliminary Report on Patentability for corresponding PCT Application No. PCT/JP2011/005686, Jul. 16, 2013.

JP Office Action and English translation for corresponding JP Patent Application No. 2011-006340, dated Jun. 3, 2014.

"Special edition 3: Simple map software utilization art," Nikkei IT 21, Mar. 2002 issue (vol. 2, No. 3, Serial No. 9), Nikkei Business Publications, Inc., Mar. 1, 2002, pp. 69-81, ISSN: 1346-3780 (for relevancy see JP Office Action and English translation for corresponding JP Patent Application No. 2011-006340, dated Jun. 3, 2014).

Hiroshi Matoba (and one other), "Multimedia engine 'Ruri' (part 1)," the Collection of the 52nd (1996, preceding period) national convention conference papers (3) of the Information Processing Society of Japan, 9 pages, third separate volume, Mar. 6, 1996, the Information Processing Society of Japan, pp. 3-197 to 3-198 (for relevancy see JP Office Action and English translation for corresponding JP Patent Application No. 2011-006340, dated Jun. 3, 2014).

* cited by examiner

FIG.10

| ID | USER NAME | CREATION DATE AND TIME | DISPLAY INFORMATION | SETTING POSITION INFORMATION | LINK INFORMATION |
|---|---|---|---|---|---|
| 1 | bbb | 2010,12,1,18:00 | I WANT A ROOF WINDOW. | (0.28, 0.2, 0.06) | — |
| 2 | bbb | 2010,12,1,18:11 | SIMPLE STEERING | (0.65, 0.2, 0.0625) | ID3,ID6 |
| 3 | bbb | 2010,12,1,18:15 | IT'S SUPPOSEDLY HAND BUILT BY A MECHANIC! | (0.65, 0.2, 0.25) | ID2,ID6 |
| 4 | aaa | 2010,12,1,22:15 | THE BACK VIEW IS SUPER COOL! | (0.9, 0.8, 0.016) | — |
| 5 | aaa | 2010,12,1,22:20 | I WANNA CHANGE THE COLOR. | (0.38, 0.2, 0.05) | — |
| 6 | aaa | 2010,12,1,22:22 | AWESOME | (0.65, 0.2, 0.25) | ID2,ID3 |
| 7 | ccc | 2010,12,1,00:05 | IT'S ACTUALLY AN LED LIGHT. | (0.1, 0.3, 0.3) | — |

| USER NAME | CREATION DATE AND TIME | INPUT INFORMATION | POSITION INFORMATION |
|---|---|---|---|
| ddd | 2010,12,2,12:00 | NICE | (0.65,0.2,0.25) |

INFORMATION PROCESSING DEVICE

BACKGROUND OF THE INVENTION

1. Field of the Invention

The present invention relates to a processing technology for enlarging/reducing an image displayed on a display or moving the image upward, downward, leftward, or rightward.

2. Description of the Related Art

Home entertainment systems are proposed that are capable of reproducing moving images as well as running game programs. In the home entertainment systems, a GPU generates three-dimensional images using polygons (see, e.g., patent document No. 1).

In recent years, a technology is proposed that is capable of enlarging/reducing a display image or moving the image upward, downward, leftward, or rightward, using tile images of a plurality of resolutions generated from a digital image such as a high-definition photo. In this image processing technology, the size of an original image is reduced in a plurality of stages to generate images of different resolutions so as to represent the original image in a hierarchical structure where the image in each layer is divided into one or a plurality of tile images. Normally, the image with the lowest resolution comprises one tile image. The original image with the highest resolution comprises the largest number of tile images. An information processing device is configured to present an enlarged view or reduced view promptly by switching a currently used tile image to a tile image of a different layer at the time of performing a process of enlarging or reducing a display image.

[Patent document No. 1] U.S. Pat. No. 6,563,999

By enlarging an image of content, a user can check detailed parts of the content. By reducing the image of the content, the user can see the overall balance of the content. Therefore, a tool that allows a content image to be easily enlarged or reduced is important in the evaluation of the content. The user usually desires to use other people's evaluation as a reference at this time. Thus, the development of an application is desired that allows other people's evaluation to be used as a reference and that allows the user's own evaluation to be provided to other people.

SUMMARY OF THE INVENTION

In this background, a purpose of the present invention is to provide an application for displaying input entered by another user or allowing user's own input to be reflected at the time of the display of a content image.

An information processing device according to one embodiment of the present invention is configured to display a whole or a part of an entire image on a display and includes: a reception unit configured to receive a change instruction to change a display image; a display image generation unit configured to identify, according to the change instruction, a scaling factor of an image to be displayed or information related to the scaling factor and to generate a display image, which is the whole or a part of the entire image; an acquisition unit configured to acquire superimposition data for display over the display image; and a superimposition processing unit configured to generate a superimposition image from the superimposition data. The superimposition data includes a scaling factor or information related to the scaling factor. The superimposition processing unit includes: a determination unit configured to determine whether the scaling factor of the display image generated by the display image generation unit and either the scaling factor or the information related to the scaling factor included in the superimposition data are in a predetermined relationship; and a superimposition image generation unit configured to generate a superimposition image to be displayed on the display image based on the superimposition data.

Another embodiment of the present invention also relates to an information processing device. This device is configured to display a whole or a part of an entire image on a display and includes: a first reception unit configured to receive a change instruction to change a display image; a display image generation unit configured to identify, according to the change instruction, a scaling factor of an image to be displayed or information related to the scaling factor and generate a display image, which is the whole or a part of the entire image; a second reception unit configured to receive input from a user; and an input processing unit configured to process the input received by the second reception unit. The input processing unit includes: a position information acquisition unit configured to acquire position information that identifies a position in the display image at which the second reception unit has received the input; and an associating unit configured to associate the position information acquired by the position information acquisition unit with the input from the user, the position information including the scaling factor or information related to the scaling factor of the display image in which the second reception unit has received the input.

Optional combinations of the aforementioned constituting elements, and implementations of the invention in the form of methods, apparatuses, systems, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 10 is a diagram illustrating an example of comment data accumulated in an accumulation server;

DETAILED DESCRIPTION OF THE INVENTION

The invention will now be described by reference to the preferred embodiments. This does not intend to limit the scope of the present invention, but to exemplify the invention.

Figure 1:
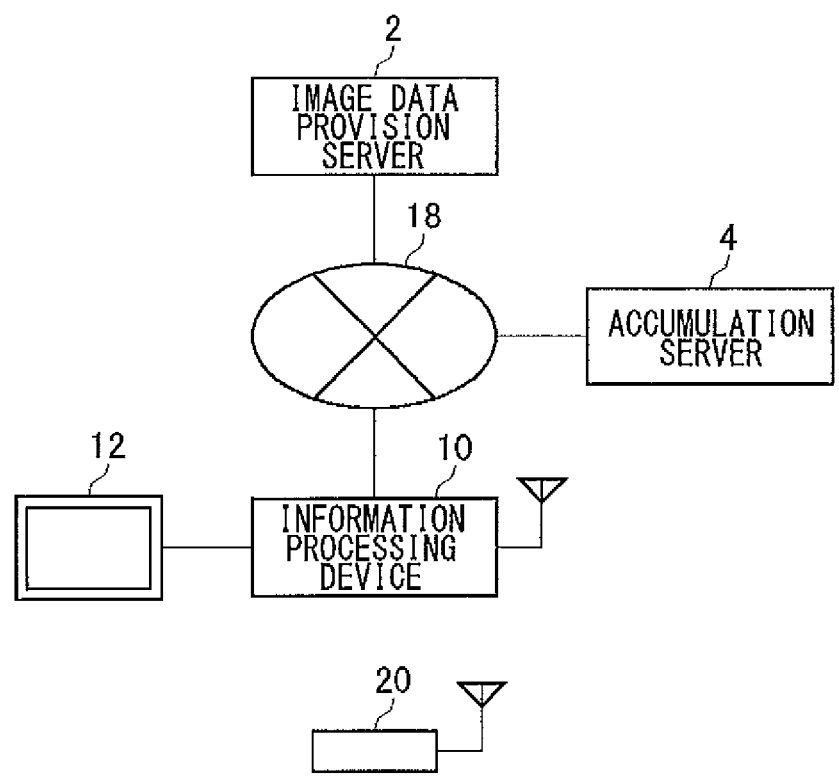
FIG. 1 is a diagram illustrating an information processing system according to an embodiment of the present invention.

FIG. 1 illustrates an information processing system 1 according to an embodiment of the present invention. The information processing system 1 is provided with an information processing device 10, an image data provision server 2, and an accumulation server 4, which are connected so as to communicate with each other via a network 18. The network 18 may be, for example, the Internet using TCP/IP protocol. A single information processing device 10 is shown in FIG. 1. Alternatively, a plurality of information processing devices 10 may be connected to the network 18.

The information processing device 10 has an output device 12. The output device 12 may be a TV set having a display for outputting an image and a speaker for outputting a sound or may be a computer display. The output device 12 may be connected to the information processing device 10 via a wired cable or wirelessly via a wireless LAN (Local Area Network) or the like. An input device 20 is an input interface for entering user's operation information in the information processing device 10.

In the information processing system 1, the information processing device 10 has a function of performing image processing. The information processing device 10 changes a display image in accordance with operation information entered in the input device 20 by the user. For example, the information processing device 10 enlarges/reduces the display image displayed on a display of the output device 12 or moves the image upward, downward, leftward, or rightward.

The information processing device 10 may be a game device that runs a GUI application or a game application, and the image processing function may be achieved by loading a program for image processing. The information processing device 10 may be a personal computer capable of running various applications, and the image processing function may be achieved by loading a program for image processing. The information processing device 10, the input device 20, and the output device 12 may be formed integrally. For example, the devices may be configured as a mobile terminal device provided with an image processing function.

The image data provision server 2 stores hierarchized image data that expresses the entire image of a single item of content by tile images of a plurality of resolutions. The image data provision server 2 stores image data for a plurality of items of content, and each item of image data is distinguished by identification information that identifies content (hereinafter, referred to as "content ID"). In accordance with a request from the information processing device 10, the image data provision server 2 provides to the information processing device 10 one or more tile images that are necessary for the generation of a display image in the information processing device 10. The image data provision server 2 may provide the entire hierarchized image data to the information processing device 10.

The information processing device 10 connects to the network 18 and acquires the tile image necessary for the generation of the display image by arbitrarily downloading the tile image from the image data provision server 2 in accordance with the operation information entered in the input device 20. The information processing device 10 may download and acquire the entire compressed image data that is hierarchized from the image data provision server 2.

For a content image, the accumulation server 4 accumulates comments entered by a plurality of users. The accumulation server 4 stores comment data for a plurality of items of content, and each item of comment data is linked to a content ID. The accumulation server 4 provides the comment data to the information processing device 10 in accordance with a request from the information processing device 10. The image data provision server 2 and the accumulation server 4 are shown as separate servers in FIG. 1. Alternatively, these servers may be configured as a single server.

In the information processing system 1, a user of the information processing device 10 can use a comment entered by another user as a reference on a content image and add a comment by himself/herself on the content image displayed on the output device 12. A comment entered by another user is accumulated in the accumulation server 4. When downloading image data of given content from the image data provision server 2, the information processing device 10 downloads comment data linked to the same content ID from the accumulation server 4, thereby allowing the comment entered by another user to be displayed.

The information processing device 10 according to the present embodiment enlarges/reduces the content image or moves the content image upward, downward, leftward, or rightward, in accordance with a user instruction and then displays the whole or a part of the entire content image. In the present embodiment, the entire image of content represents, for example, a spread of a single magazine, that is, two right and left pages that face each other when the magazine is opened. When the user operates the input device 20 so as to enter a comment on an image being displayed, the information processing device 10 associates the entered comment with an input position in the display image. The comment and input position information (comment setting position information) that are associated are transmitted to the accumulation server 4 along with a content ID thereof and accumulated in the accumulation server 4.

In the present embodiment, a content image is enlarged/reduced. Thus, comment setting position information is identified by three parameters in a virtual three-dimensional space. As an example, the comment setting position information is expressed by an x-coordinate value and a Y-coordinate value that represent a single point on an X-Y plane and a ratio of enlargement or reduction (hereinafter, referred to as a "scaling factor"). In the present embodiment, a requirement for displaying a comment is set to be a condition where the x-coordinate value and the y-coordinate value of the comment setting position information are included in the display image and a condition where the scaling factor of the display image is in the vicinity of the scaling factor of the comment setting position information.

Upon download of image data, the information processing device 10 first displays the entirety of a content image on the output device 12. When the user determines an area in which the user desires to view details after viewing the entire image of content, the user operates the input device 20 so as to display the area in an enlarged manner. If a comment is added to the area and the scaling factor of a display image reaches the vicinity of the scaling factor of the comment setting position information at this time, the information processing device 10 displays the comment on the display image in a superimposed manner. With this, the user can refer to the comment added by another user. Until the scaling factor of the display image reaches the vicinity of the scaling factor of the comment setting position information, an indicator of some sort may be displayed that notifies the user that the comment exists.

Figure 2:
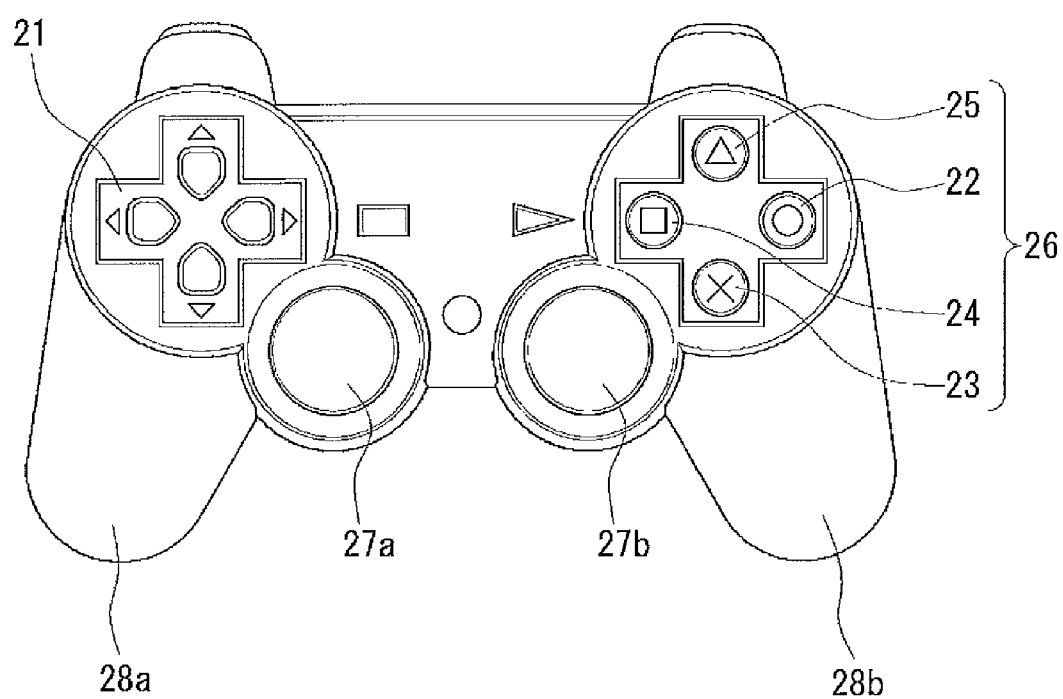
FIG. 2 is a diagram illustrating the exterior configuration of an input device.

FIG. 2 illustrates the exterior configuration of the input device 20. The input device 20 is provided with directional keys 21, analog sticks 27a and 27b, and four types of operation buttons 26 as an operation means that can be operated by the user. The four types of operation buttons 26 comprise a circle button 22, a cross button 23, a square button 24, and a triangle button 25.

The operation means of the input device 20 in the information processing system 1 is assigned a function of entering an instruction for enlarging/reducing a display image and a function of entering an instruction for scrolling upward, downward, leftward, or rightward. For example, the function of entering an instruction for enlarging/reducing a display image may be assigned to the right analog stick 27b. The user can enter an instruction to reduce a display image by pulling the analog stick 27b toward the user and can enter an instruction to enlarge a display image by pushing the analog stick 27b away from the user. The function of entering an instruction for scrolling a display image is assigned to the analog stick 27a. By tilting the analog stick 27a back and forth and around, the user can enter an instruction for scrolling a display image. In the present embodiment, an instruction for enlarging, reducing, or scrolling a display image is generically referred to as an image changing instruction.

The input device 20 has a function of transmitting, to the information processing device 10, a signal for instructing a change of an image that has been entered. In the present embodiment, the input device 20 is configured to be capable of communicating wirelessly with the information processing device 10. The input device 20 and the information processing device 10 may establish a wireless connection by using Bluetooth (registered trademark) protocol or IEEE 802.11 protocol. The input device 20 may be connected to the information processing device 10 via a cable so as to transmit a signal for instructing a change of an image to the information processing device 10.

Figure 3:
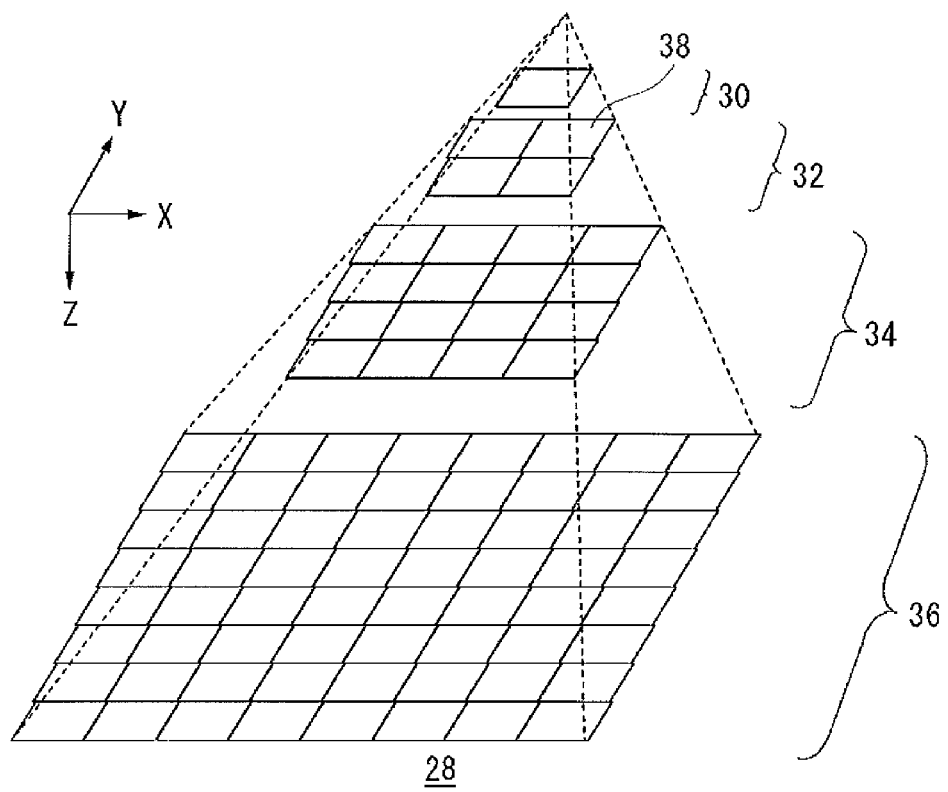
FIG. 3 is a diagram illustrating the hierarchical structure of image data used in the information processing system.

FIG. 3 shows the hierarchical structure of image data used in the information processing system 1. This image data is stored in the image data provision server 2, and the image data provision server 2 arbitrarily provides a tile image necessary for the generation of a display image to the information processing device 10. The image data provision server 2 notifies the information processing device 10 of structural data that shows the hierarchical structure of the image data. Using this data, the information processing device 10 may derive spatial coordinates for identifying a frame image (display image) from operation information entered in the input device 20. This hierarchical structure is communalized among all items of content. Therefore, the information processing device 10 may derive spatial coordinates based on communalized structural data as shown in the following.

The image data has a hierarchical structure comprising a 0-th layer 30, a first layer 32, a second layer 34, and a third layer 36 in the direction of depth (Z axis). Hereinafter, image data having such a hierarchical structure will be referred to as "hierarchical data". A fourth layer or a layer higher than the fourth layer may be provided. The number of layers may be three or less. However, at least two layers exist. The hierarchical data 28 shown in FIG. 3 has a quadtree hierarchical structure. Each layer comprises one or more tile images 38. All of the tile images 38 are formed to have the same size having the same number of pixels. For example, the tile images 38 have 256 by 256 pixels. Image data in the respective layers are representations of a single entire image in different resolutions. The original image in the third layer 36 having the highest resolution is reduced in a plurality of stages to generate image data for the second layer 34, the first layer 32, and the 0-th layer 30. For example, the resolution in an N-th layer (N is an integer equal to or greater than 0) may be ½ the resolution of the (N+1)-th layer in both the horizontal (X axis) direction and the vertical (Y axis) direction.

In the hierarchical data structure shown in FIG. 3, the position in the depth (Z axis) direction indicates the resolution. The closer to the 0-th layer 30, the lower the resolution, and, the closer to the third layer 36, the higher the resolution. In terms of the size of an image displayed on the display, the position in the depth direction represents a scaling factor. Assuming that the scaling factor of a display image in the third layer 36 is 1, the scaling factor in the second layer 34 is ¼, the scaling factor in the first layer 32 is 1/16, and the scaling factor in the 0-th layer 30 is 1/64. Therefore, if the display image changes in the depth direction away from the 0-th layer 30 toward the third layer 36, the display image is enlarged. If the display image changes in the direction away from the third layer 36 toward the 0-th layer 30, the display image is reduced.

The hierarchical data 28 is compressed in a predetermined compression format and stored in a memory device in the image data provision server 2. Compression of the hierarchical data may be performed for each tile image. Alternatively, a plurality of tile images included in the same layer or different layers may be compressed at a time. The image data provision server 2 holds respective pieces of hierarchical data 28 of a plurality of items of content. The plurality of pieces of hierarchical data 28 are identified by respective content IDs.

As shown in FIG. 3, the hierarchical structure of a piece of hierarchical data 28 is configured such that the horizontal direction is defined along the X axis, the vertical direction is defined along the Y axis, and the depth direction is defined along the Z axis, thereby building a virtual three-dimensional space. In the hierarchical structure, the X axis and the Y axis define a common coordinate system in which the original point of the X axis and the Y axis is fixed. The information processing device 10 derives the amount of change of a display image by referring to an image changing instruction supplied from the input device 20 and uses the amount of change that has been derived so as to derive information identifying a layer and texture coordinates (UV coordinates) in the layer. The combination of the information identifying the layer and the texture coordinates will be referred to as spatial coordinates. Spatial coordinates in the virtual space are used to identify a tile image to be used and generate a display image. The information processing device 10 may derive the coordinates of the four corners of a frame image in the virtual space by using the amount of change of the display image. The frame coordinates of the four corners will also be referred to as spatial coordinates. As the spatial coordinates, the information processing device 10 may derive the coordinates (X, Y) of the center of the frame image in the virtual space and the scaling factor (SCALE). The information processing device 10 may identify an area for use in a tile image 38 of a relevant layer by referring to the signal for instructing the change of the image supplied from the input device 20. A method for identification that is employed is nonrestrictive.

When the information processing device 10 acquires a tile image necessary for the generation of the display image by arbitrarily downloading the tile image from the image data provision server 2, the information processing device 10 transmits the derived spatial coordinates to the image data provision server 2, and the image data provision server 2 provides the tile image identified by the spatial coordinates to the information processing device 10. The image data provision server 2 may identify, for example, a tile image that will become necessary in the future and provide the tile image to the information processing device 10 in advance. If the information processing device 10 is downloading the entire hierarchical data from the image data provision server 2, the information processing device 10 may identify the area for use of the tile image 38 by referring to the derived spatial coordinates.

Figure 4:
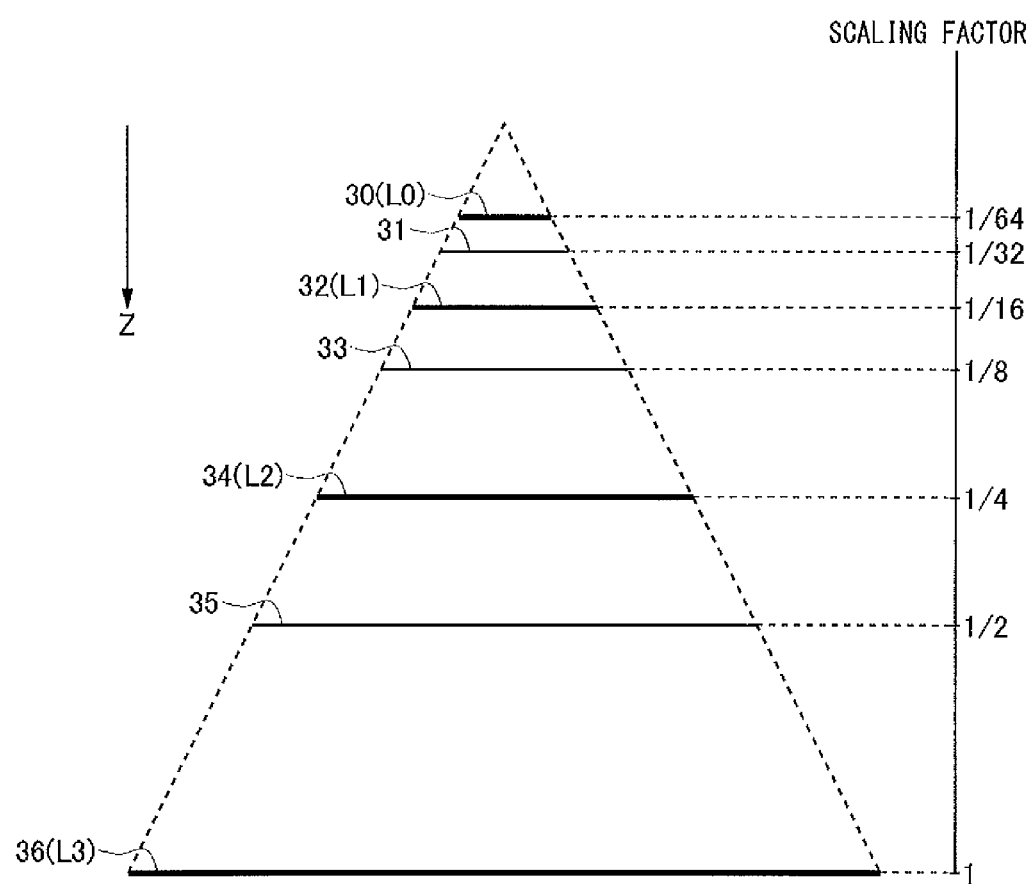
FIG. 4 is a diagram for explaining a relationship of a scaling factor.

FIG. 4 is a diagram for explaining a relationship of a scaling factor. In this hierarchical data structure, the layers are represented as L0 (0-th layer 30), L1 (first layer 32), L2 (second layer 34), and L3 (third layer 36), respectively. In the hierarchical data structure shown in FIG. 4, the position in the depth (Z axis) direction indicates the resolution. The closer to L0, the lower the resolution, and, the closer to L3, the higher the resolution. In terms of the size of an image displayed on the display, the position in the depth direction represents the scaling factor. Assuming that the scaling factor of a display image in L3 is 1, the scaling factor in L2 is ¼, the scaling factor in L1 is ¹⁄₁₆, and the scaling factor in L0 is ¹⁄₆₄.

The respective scaling factors of a first border 31, a second border 33, and a third border 35 are defined based on L3 and used as criteria for determining the layer of a tile image used for the generation of a display image. The scaling factor of the first border 31 is set to be ¹⁄₃₂. If a required scaling factor of the display image is smaller than ¹⁄₃₂, an L0 tile image is used for the generation of the display image. The scaling factor of the second border 33 is set to be ⅛. If a required scaling factor of the display image is ¹⁄₃₂ or larger and is smaller than ⅛, an L1 tile image is used for the generation of the display image. Similarly, the scaling factor of the third border 35 is set to be ½. If a required scaling factor of the display image is ⅛ or larger and is smaller than ½, an L2 tile image is used. If a required scaling factor of the display image is ½ or larger, an L3 tile image is used. Therefore, if a required scaling factor of an image to be displayed hereafter is determined, the information processing device 10 can acquire a tile image of resolution that corresponds to the scaling factor from the image data provision server 2 and generate a display image that is adjusted to the scaling factor. The scaling factor may be expressed by a z coordinate in the depth direction in the virtual three-dimensional space shown in FIG. 3. The z coordinate in this case can be treated as information related to the scaling factor in the information processing device 10. Similarly, the scaling factor may be expressed by resolution in the virtual three-dimensional space. The resolution in this case can be also treated as information related to the scaling factor in the information processing device 10.

Figure 5:
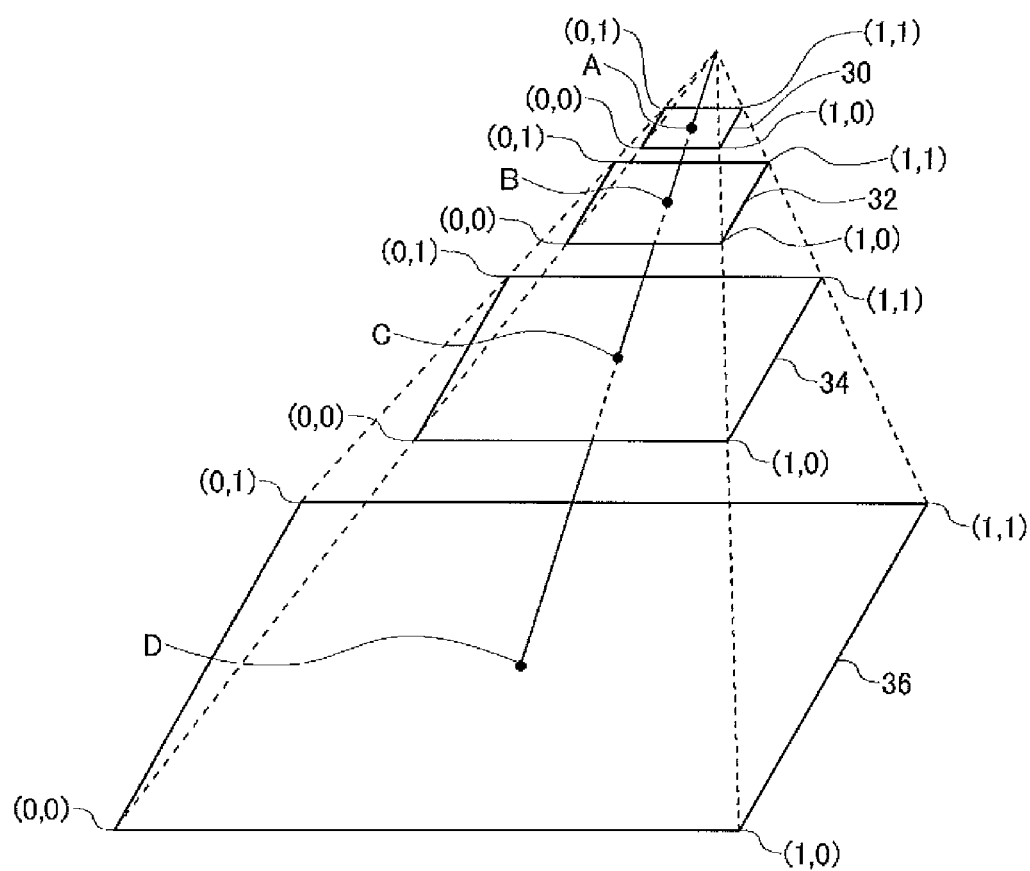
FIG. 5 is a diagram for explaining a coordinate system in hierarchical data.

FIG. 5 is a diagram for explaining a coordinate system in hierarchical data. As stated previously, image data of each layer is expressed by a common coordinate system in which the original point of the X axis and the Y axis is fixed. In terms of a point (x, y) on the X-Y plane, space coordinates are expressed by (x, y, SCALE) in the virtual three-dimensional space of the hierarchical data. More specifically, the coordinates of a point A on the 0-th layer 30, the coordinates of a point B on the first layer 32, the coordinates of a point C on the second layer 34, and the coordinates of a point D on the third layer 36 are expressed by (x, y, ¹⁄₆₄), (x, y, ¹⁄₁₆), (x, y, ¼), and (x, y, 1), respectively.

Figure 6:
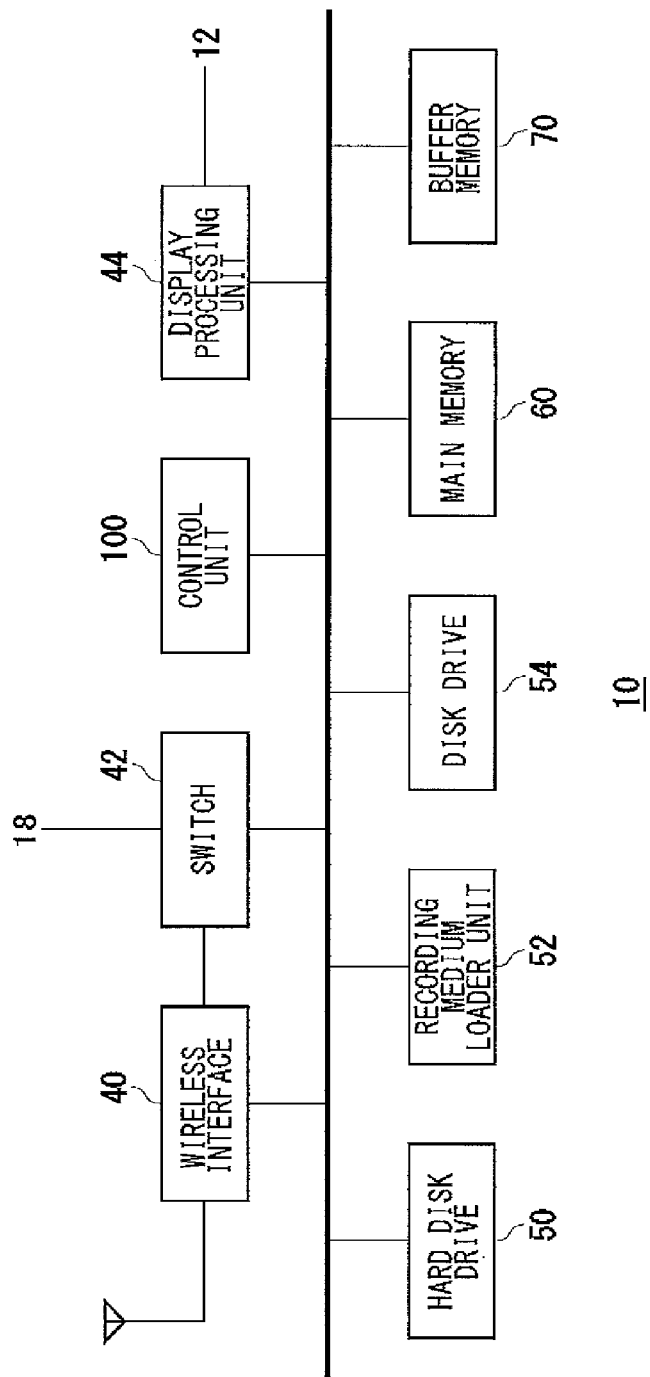
FIG. 6 is a functional block diagram of the information processing device.

FIG. 6 illustrates a functional block diagram of the information processing device 10. The information processing device 10 comprises a wireless interface 40, a switch 42, a display processing unit 44, a hard disk drive 50, a recording medium loader unit 52, a disk drive 54, a main memory 60, a buffer memory 70, and a control unit 100. The display processing unit 44 buffers data to be displayed on the display of the output device 12 by using a frame memory. As will hereinafter be described, the display processing unit 44 has a function of displaying a superimposition image being overlaid on a content image.

The switch 42 is an Ethernet switch (Ethernet is a registered trademark) and a device that is connected to an external device by wire or wirelessly so as to transmit and receive data. The switch 42 connects to the external network 18, receives title image data from the image data provision server 2, and receives comment data from the accumulation server 4. The switch 42 connects to the wireless interface 40, and the wireless interface 40 connects to the input device 20 through a predetermined wireless communication protocol. A signal for instructing a change of an image entered by the user via the input device 20 is supplied to the control unit 100 via the wireless interface 40 and the switch 42.

The hard disk drive 50 functions as an auxiliary memory device for storing data. Compressed image data received via the switch 42 is stored in the main memory 60. In the case of downloading the entire hierarchical data, the hierarchical data may be stored in the hard disk drive 50. When a removable recoding medium such as a memory card is loaded, the recording medium loader unit 52 reads out data from the removable recoding medium. When a read-only ROM disk is loaded, the disk drive 54 drives and recognizes the ROM disk so as to read out data. The ROM disk may be an optical disk or a magneto-optical disk, and compressed image data may be stored therein. The compressed image data may be preinstalled in the hard disk drive 50. Alternatively, the compressed image data may be stored in a removable recording medium or a ROM disk and read into the main memory 60 at the time when a display process is performed.

The control unit 100 is provided with a multi-core CPU. One general-purpose processor core and a plurality of simple processor cores are provided in one CPU. The general-purpose processor core is referred to as a PPU (Power Processing Unit), and the remaining processor cores are referred to as SPUs (Synergistic-Processing Unit).

The control unit 100 is provided with a memory controller that connects to the main memory 60 and the buffer memory 70. The PPU has a register and is provided with a main processor as an entity of calculation execution. The PPU efficiently assigns, to the respective SPUs, tasks serving as basic processing units in an application to be executed. The PPU itself may execute a task. The SPU has a register and is provided with a subprocessor serving as an entity of calculation execution and a local memory serving as a local memory area. The local memory may be used as the buffer memory 70. The main memory 60 and the buffer memory 70 are memory devices and are configured as RAM (Random Access Memory). The SPU has a dedicated DMA (Direct Memory Access) controller and is capable of high-speed data transfer between the main memory 60 and the buffer memory 70. High-speed data transfer is also achieved between the frame memory and the buffer memory 70. The control unit 100 according to the present embodiment realizes a high-speed image processing function by allowing a plurality of SPUs to operate in parallel. The display processing unit 44 is connected to the output device 12 and outputs a result of image processing in accordance with a user request.

Figure 7:
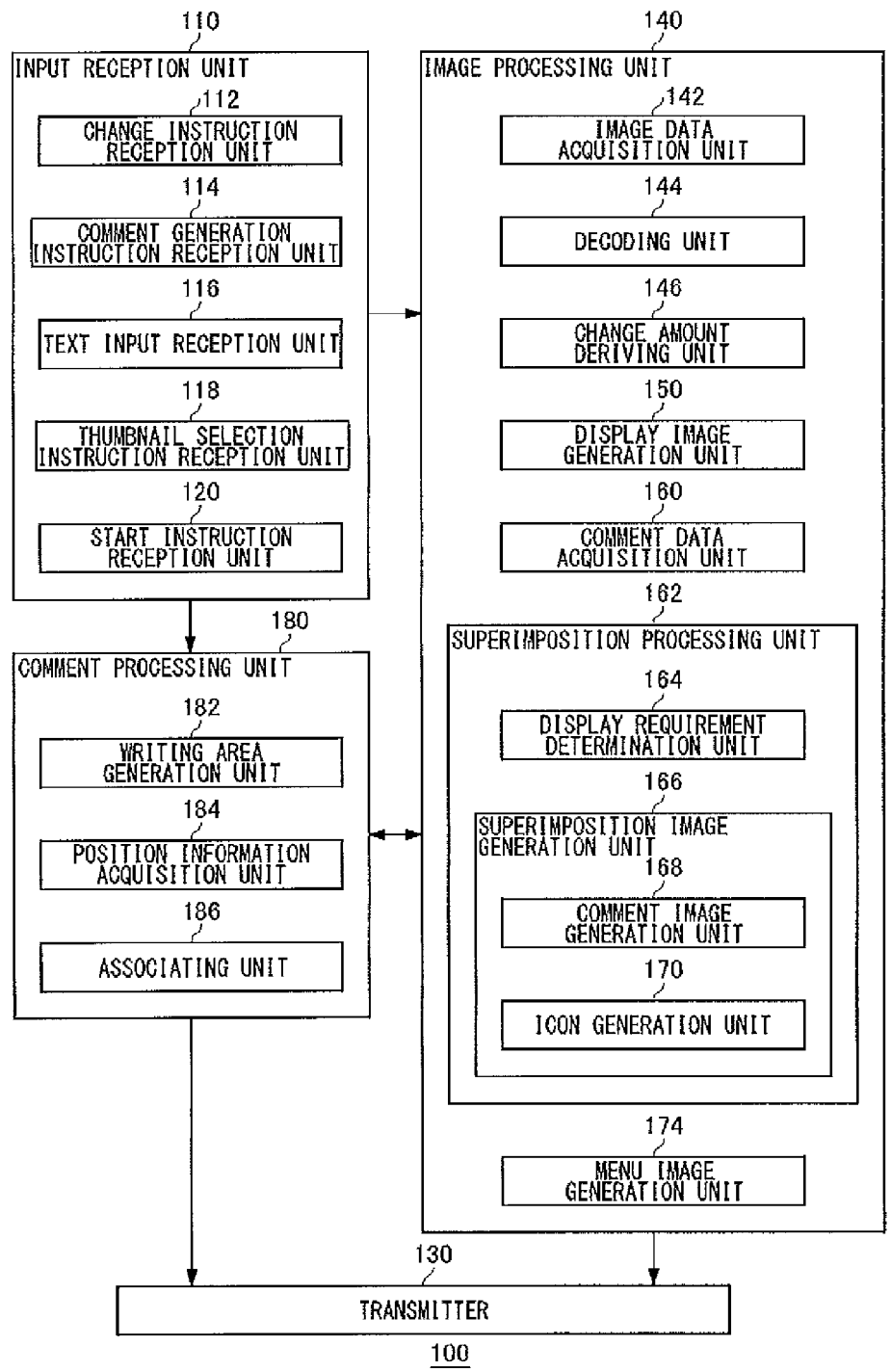
FIG. 7 is a diagram illustrating the configuration of a control unit in the information processing device.

FIG. 7 illustrates the configuration of the control unit 100 in the information processing device 10. The control unit 100 is provided with an input reception unit 110, a transmitter 130, an image processing unit 140, and a comment processing unit 180. The input reception unit 110 has a function of receiving operation information from the input device 20 and has a change instruction reception unit 112, a comment generation instruction reception unit 114, a text input reception unit 116, a thumbnail selection instruction reception unit 118, and a start instruction reception unit 120. The image processing unit 140 has a function of performing a process of generating a display image and a superimposition image, more specifically, a changing process such as enlargement/reduction and scrolling of a display image and a process of generating a comment image and an icon image. The image processing unit 140 has an image data acquisition unit 142, a decoding unit 144, a change amount deriving unit 146, a display image generation unit 150, a comment data acquisition unit 160, a superimposition processing unit 162, and a menu image generation unit 174. The superimposition processing unit 162 has a display requirement determination unit 164 and a superimposition image generation unit 166. The superimposition image generation unit 166 has a comment image generation unit 168 and an icon generation unit 170. The comment processing unit 180 has a function of processing a comment entered by the user and has a writing area generation unit 182, a position information acquisition unit 184, and an associating unit 186.

In FIG. 7, the elements shown in functional blocks that indicate a variety of processes are implemented in hardware by any CPU (Central Processing Unit), memory, or other LSI's, and in software by a program loaded in memory, etc. As stated previously, the control unit 100 has one PPU and a plurality of SPU's, and functional blocks can be formed by a PPU only, a SPU only, or the cooperation of both. Therefore, it will be obvious to those skilled in the art that the functional blocks may be implemented in a variety of manners by hardware only, software only or a combination of hardware and software.

In the information processing system 1, the information processing device 10 executes a content browsing application that allows for writing a comment and referring to a comment. In this application, a thumbnail image of browsable content is first displayed on the output device 12 as a menu screen. This thumbnail image may be a still image or a moving image. The information processing device 10 acquires the thumbnail image of browsable content from the image data provision server 2. The menu screen may be generated for each category of the content.

Figure 8:
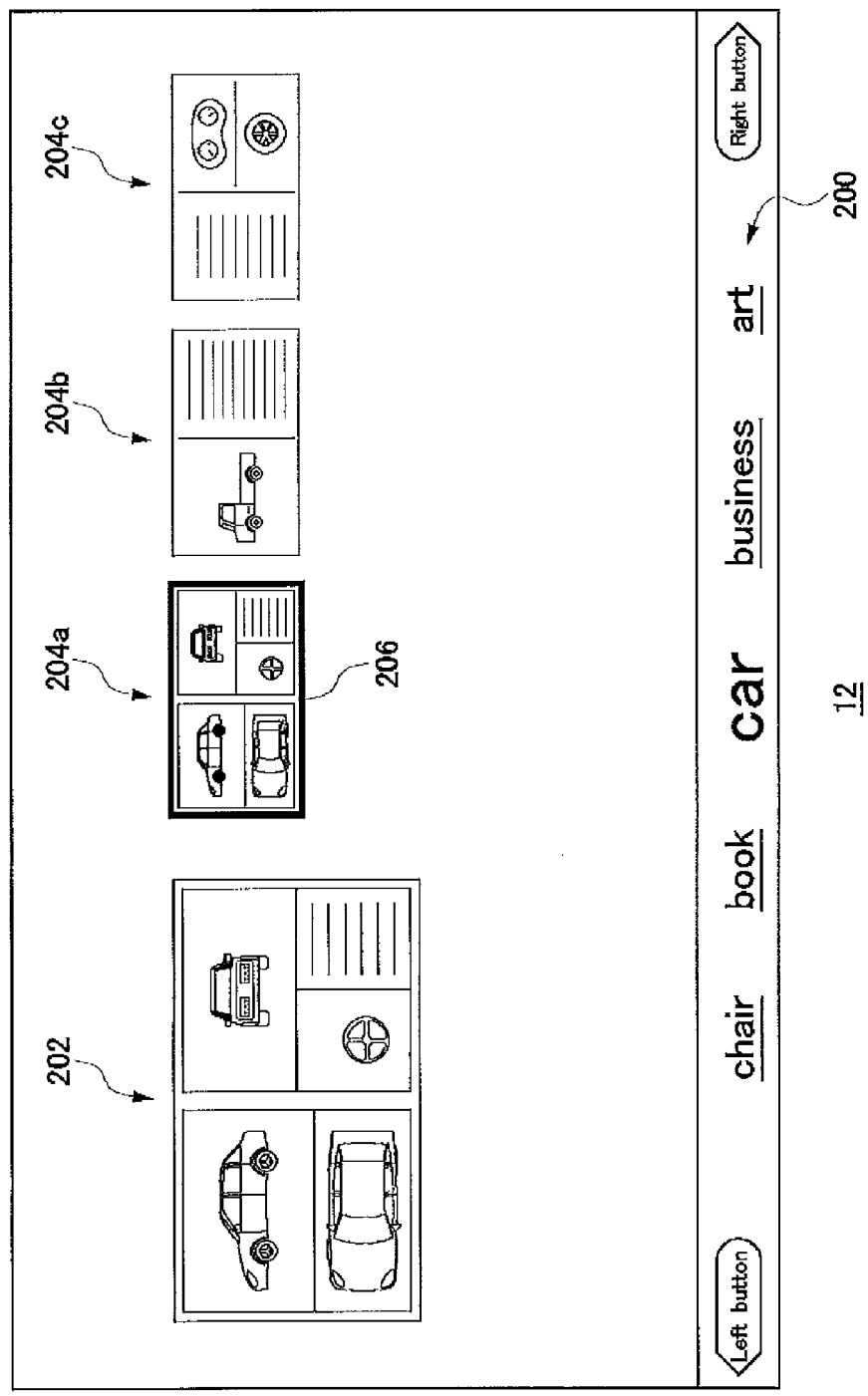
FIG. 8 is a diagram illustrating an example of a menu screen of a content browsing application.

FIG. 8 illustrates an example of a menu screen of a content browsing application. On the display of the output device 12, a category selection area 200 for selecting a category of browsable content is provided in a menu screen. The user can operate the input device 20 so as to select a category included in the category selection area 200. In FIG. 8, a category "car" is selected, and thumbnail images of content items that are browsable for the category "car" are displayed in content display areas 204a, 204b, and 204c. The user can operate the input device 20 so as to select a thumbnail image by moving a selection frame 206. An enlarged image of a thumbnail image arranged in the selection frame 206 is displayed in a selected content display area 202.

A menu image described above is generated by the menu image generation unit 174. The menu image generation unit 174 acquires menu data necessary for the generation of the menu image from the image data provision server 2. When a category is selected in the category selection area 200, the menu image generation unit 174 extracts a content ID associated to the selected category from the menu data. The transmitter 130 transmits the extracted content ID to the image data provision server 2 via the switch 42, and the image data provision server 2 provides a thumbnail image associated to the content ID to the information processing device 10. When the image data acquisition unit 142 receives the thumbnail image, the menu image generation unit 174 pastes the thumbnail image to a content display area 204.

When the thumbnail selection instruction reception unit 118 receives an instruction for selecting a thumbnail image displayed in a content display area 204, that is, an instruction for moving the selection frame 206, the menu image generation unit 174 moves the selection frame 206 among the content display areas 204 and displays an enlarged image of a selected thumbnail image in the selected content display area 202. This enlarged image may be provided from the image data provision server 2. When the user presses the circle button 22 of the input device 20 on the menu screen shown in FIG. 8, a display process of a content image shown in the selected content display area 202 is started.

Figure 9:
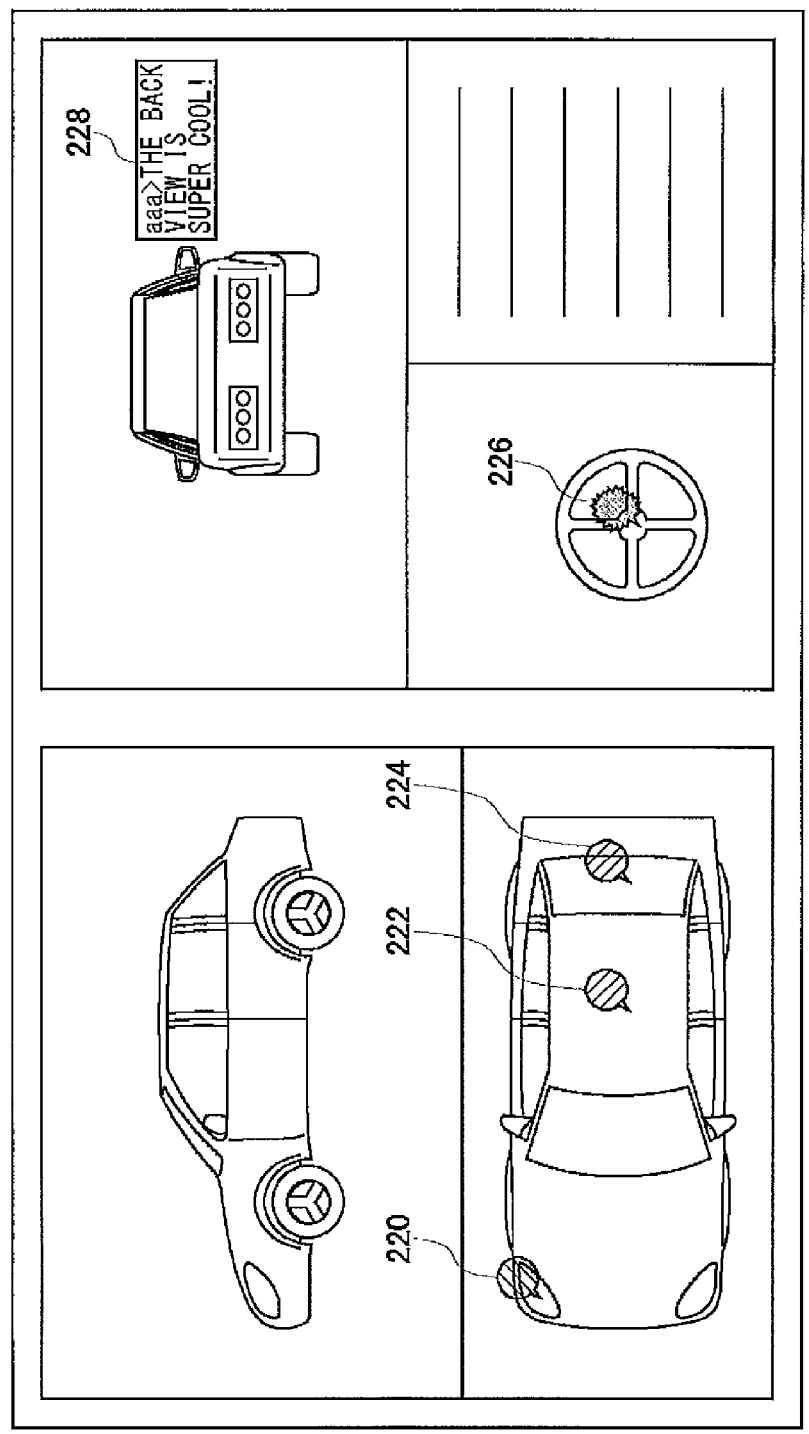
FIG. 9 is a diagram illustrating an example of a display image shown on an output device at the start of a process of displaying a content image.

FIG. 9 illustrates an example of a display image shown on the output device 12 at the start of the display process performed on the content image. When the user presses the circle button 22 on the menu screen shown in FIG. 8, the start instruction reception unit 120 receives operation information thereon as an instruction for starting the display process, and the image data acquisition unit 142 acquires initial image data of the content image from the image data provision server 2. The image data provision server 2 stores a tile image for generating an initial image in the information processing device 10 in advance. When the image data acquisition unit 142 transmits through the transmitter 130 a request for acquiring an initial image along with a content ID, the image data provision server 2 transmits to the information processing device 10 the tile image that constitutes the initial image identified by the content ID.

When the start instruction reception unit 120 receives the instruction for starting the display process, the comment data acquisition unit 160 acquires comment data from the accumulation server 4. When the comment data acquisition unit 160 transmits through the transmitter 130 a request for acquiring comment data along with a content ID, the accumulation server 4 transmits to the information processing device 10 comment data identified by the content ID.

FIG. 10 illustrates an example of the comment data accumulated in the accumulation server 4. In FIG. 10, the comment data is shown in a table format. The comment data may be accumulated in a predetermined format such as a CSV format. The comment data is superimposition data for display over an image displayed on the output device 12 and comprises items for identification information (ID), a user name, a creation date and time, display information, setting position information, and link information.

An ID represents information for identifying comment data and is assigned starting from 1 from the oldest in the order of the creation date and time of a comment. A user name represents information for identifying a user who has created a comment. Display information indicates text (comment) entered by a user. In the figure, an example is shown where display information represents a comment entered by a user in a text format. Alternatively, the display information may represent, for example, a photo image, a character image, or the like. Setting position information represents information for identifying position information for a position at which a comment has been entered in the virtual three-dimensional space formed by the hierarchical data. Link information represents information indicating whether or not a link is provided among comments. If a link is provided, the ID of corresponding comment data is written. If no link is provided, a null value is written.

Referring back to FIG. 7, when the start instruction reception unit 120 receives the instruction for starting the display process, the image data acquisition unit 142 acquires the tile image for the initial image from the image data provision server 2, and the comment data acquisition unit 160 acquires comment data from the accumulation server 4. The tile image data and the comment data are stored in the main memory 60. A format for storing the comment data may be a table format or a CSV format. The display image generation unit 150 then generates, by using the acquired tile image, the initial image of the content image, and the superimposition processing unit 162 generates, by using the acquired comment data, a superimposition image to be superimposed over the initial image. The initial image of the content image is an image of the entire content, that is, an image of the entire spread of the magazine in the present embodiment. The superimposition processing unit 162 provides the generated superimposition image to the display processing unit 44. The display processing unit 44 displays, in a superimposed manner, the superimposition image generated by the superimposition processing unit 162 on the display image generated by the display image generation unit 150 and generates a frame image shown in FIG. 9.

In FIG. 9, a plurality of icon images 220, 222, 224, and 226 and a comment image 228 are displayed. These icon images and the comment image are superimposition images generated by the superimposition processing unit 162 and are synthesized to be a content image by the display processing unit 44. The comment image 228 is generated from display information included in comment data. Referring to FIG. 10, display information of comment data for ID 4 is shown. The icon images 220, 222, 224, and 226 are mark images for informing the existence of display information (i.e., a comment). Enlargement of the display of an area in which an icon image is added allows the user to view a comment. The display mode of each of the icon images 220, 222, 224, and 226 is determined based on a relationship between the scaling factor of an image displayed on the output device 12 and the scaling factor included in the comment data.

Before giving an explanation regarding the operation of the superimposition processing unit 162, an explanation will be given in the following regarding a process of generating a display image by the display image generation unit 150. When the user operates the analog stick 27 of the input device 20, a signal for instructing a change of an image is transmitted to the information processing device 10. The change instruction reception unit 112 receives from the input device 20 a signal for instructing a change of a display image displayed on the display.

Based on the signal for instructing the change, the change amount deriving unit 146 derives the amount of change of the display image requested to be displayed. The amount of change of the display image is the amount of displacement in the vertical and horizontal directions and the amount of displacement in the depth direction of the display image for each frame in the virtual three-dimensional space of the hierarchical data. The display image generation unit 150 determines the space coordinates (position information) of a present frame to be moved from the space coordinates of a previous frame based on the derived the amount of change. In this case, space coordinates represent position information (X, Y, SCALE) identified by the coordinates (X, Y) of the center of a frame image and a scaling factor SCALE. The change amount deriving unit 146 derives the amount of change ($\Delta$X, $\Delta$Y, $\Delta$SCALE) based on the signal for instructing the change, and the display image generation unit 150 incorporates the amount of change ($\Delta$X, $\Delta$Y, $\Delta$SCALE) into position information (Xprev, Yprev, SCALEprev) of the previous frame so as to determine position information (X, Y, SCALE) of the present frame. As described, the display image generation unit 150 identifies the scaling factor SCALE of an image that is displayed. As described previously, the display image generation unit 150 may identify information related to the scaling factor such as resolution.

The transmitter 130 transmits the space coordinates determined by the display image generation unit 150 to the image data provision server 2. Upon receiving the space coordinates, the image data provision server 2 determines whether it is necessary to change a tile image for generating the display image in the information processing device 10. If it is necessary to change the tile image, the image data provision server 2 provides the tile image to the information processing device 10. Upon acquiring the tile image, the image data acquisition unit 142 stores the tile image in the main memory 60. The decoding unit 144 reads the tile image used for generating the display image from the main memory 60, decodes the tile image, and stores the decoded tile image in the buffer memory 70. The display image generation unit 150 generates the display image (frame image) by using the tile image stored in the buffer memory 70 based on the position information and provides the display image to the frame memory 90. The generated display image expresses the whole or a part of the entire content image. The whole of the entire image means the display image shown in FIG. 9, and a part of the entire image means an image obtained by enlarging the display of the display image shown in FIG. 9.

As described, the generation of the display image by the display image generation unit 150 allows the information processing device 10 to perform a process of enlarging or reducing the display image or a process of scrolling the display image at high speed and thus to provide the user with smooth image changes.

An explanation is now given regarding the operation of the superimposition processing unit 162. Based on comment data, the superimposition processing unit 162 generates a superimposition image to be superimposed on the display image. As shown in FIG. 9, the superimposition image includes a comment image for displaying a comment and an icon image for informing the existence of a comment.

In FIG. 10, setting position information indicates position information for a position at which a comment has been entered and includes parameters (x, y, scl), where x represents an x coordinate in a content image, where y represents a y coordinate in the content image, and where scl represents the scaling factor of the display image at the time when the comment is entered. Instead of the scaling factor, information related to the scaling factor such as resolution may be used. A parameter (x, y) represents information for identifying two-dimensional coordinates in the entire image. According to display control over a superimposition image described in the present embodiment, when the display of an initial image is enlarged such that the scaling factor of a display image becomes close to scl of setting position information, an icon image displayed in the initial image is switched to a comment image. When the display of the display image is further enlarged such that the scaling factor of the display image exceeds scl of the setting position information, display control is performed on a superimposition image in such a manner that the display of a comment gradually fades out and disappears at the end.

Figure 11:
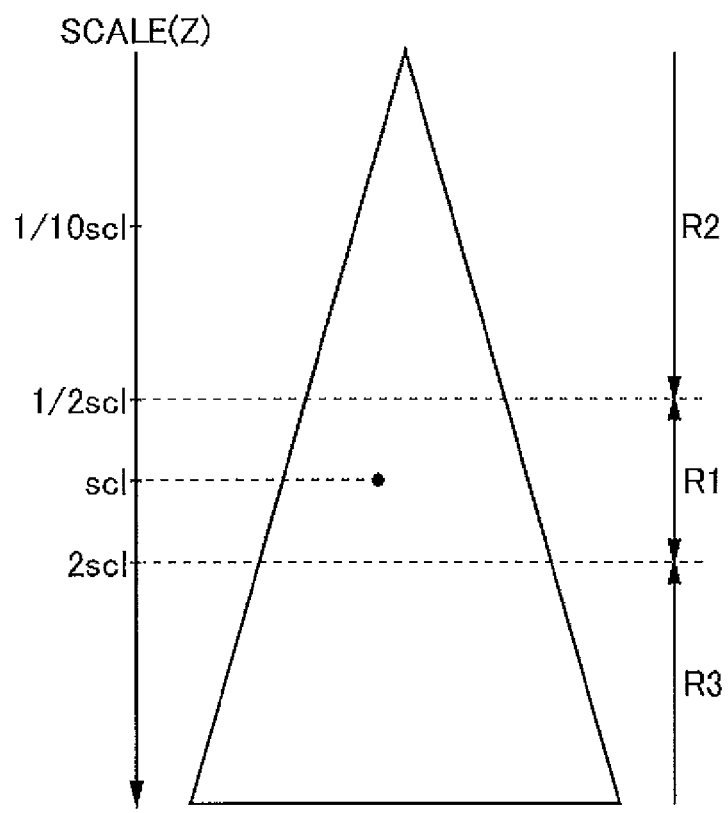
FIG. 11 is a diagram explaining display control over a superimposition image.

FIG. 11 is a diagram explaining display control over a superimposition image. There are two requirements for displaying a superimposition image. A first requirement is that two-dimensional coordinates (x, y) in setting position information is included in a display image. A second requirement is that the scaling factor of the display image and a scaling factor scl in the setting position information are in a predetermined relationship. Using FIG. 11, an explanation is given regarding the second requirement.

In reference to the scaling factor scl identified by the setting position information, a range R1 is set in a comment display area. In the range R1, a scaling factor of (½*scl) and a scaling factor of (2*scl) are a lower limit value and an upper limit value, respectively. In other words, when the following requirement is satisfied, a comment image is displayed on a display image in a superimposed manner.

$$\tfrac{1}{2}*scl \le \text{scaling factor of display image} \le 2*scl \qquad \text{(requirement a)}$$

The comment display area that is set across the range R1 prevents the user from missing a comment at the time of enlarging/reducing the display image.

An area R2, in which the scaling factor is smaller than the lower limit value, is set to an icon display area. In other words, when the following requirement is satisfied, an icon image is displayed on the display image in a superimposed manner.

$$\text{scaling factor of display image} < \tfrac{1}{2}*scl \qquad \text{(requirement b)}$$

This allows the user to learn that a comment is added in an area of interest at the time of enlarging the display image. Thus, the icon image can play a role of being an effective indicator.

An area R3, in which the scaling factor is larger than the upper limit value, is set to a non-display area. In other words, when the following requirement is satisfied, neither a comment image nor an icon image is displayed on the display image in a superimposed manner.

$$2*scl < \text{scaling factor of display image} \qquad \text{(requirement c)}$$

In the comment display area defined by the range R1, alpha blending is performed with a display image of content serving as a background and a comment image serving as a foreground. When the pixel value of the background and the pixel value of the foreground are expressed as Value0 and Value1, respectively, a pixel value Value is determined by the following calculation.

$$\text{Value}=\text{Value0}*(1-\alpha)+\text{Value1}*\alpha$$

Figure 12:
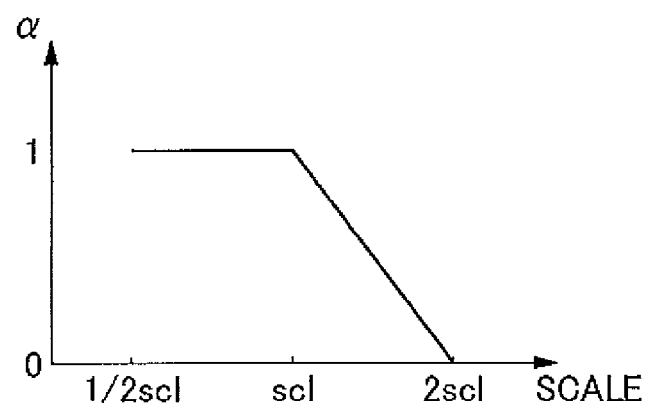
FIG. 12 is a diagram illustrating a in alpha blending.

FIG. 12 illustrates α in the alpha blending.

When the following requirement is satisfied, α is set to be 1.

$$\tfrac{1}{2}*scl \le \text{scaling factor of display image} \le scl \qquad \text{(requirement d)}$$

When the following requirement is satisfied, α is set to be [1—(scaling factor of display image—scl)*(1/scl)].

$$scl < \text{scaling factor of display image} \le 2*scl \qquad \text{(requirement e)}$$

Referring back to FIG. 11, in the icon display area defined by the area R2, the display mode of an icon image is determined based on a relationship between the scaling factor of a display image and a scaling factor scl identified by setting position information. More specifically, when the following requirement is satisfied, an icon image is colored in blue.

$$\tfrac{1}{10}*scl \le \text{scaling factor of display image} \le \tfrac{1}{2}*scl \qquad \text{(requirement f)}$$

When the following requirement is satisfied, an icon image is colored in red.

$$\text{scaling factor of display image} < \tfrac{1}{10}*scl \qquad \text{(requirement g)}$$

As described, by changing the color of the icon image according to a distance to a comment, the user can estimate time required until the user gets to the comment.

The variation of the display mode is not limited to coloration. For example, changes may be made to the size. Also, an icon image of comment data in which a link is provided may be expressed in a different form.

Figure 13A:
FIGS. 13A-13C are diagrams illustrating examples of an icon image.
Figure 13B:
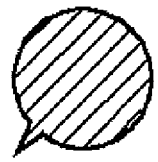

FIG. 13 illustrate examples of an icon image. FIG. 13A illustrates a blue icon image, and FIG. 13B illustrates a red icon image. In FIG. 9, the icon images 222 and 224 are blue. The icon image 222 indicates the existence of comment data for ID 1, and the icon image 224 indicates the existence of comment data for ID 5. The icon image 220 is red and indicates the existence of comment data for ID 7.

Figure 13C:
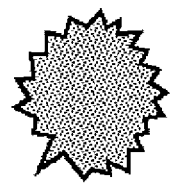

FIG. 13C illustrates an icon image indicating that a plurality of comments are associated. In FIG. 9, the icon image 226 indicates the existence of comment data for ID 2, ID 3, and ID 6.

Whether or not the above control requirements are satisfied is basically determined by the display requirement determination unit 164. An explanation is first given regarding a process of determining the first requirement. The display requirement determination unit 164 determines whether two-dimensional coordinates (x, y) included in comment data are included in a display image. When the display image generation unit 150 derives texture coordinates, the display requirement determination unit 164 determines whether or not two-dimensional coordinates for setting position information are included in the texture coordinates. In any case, the display image generation unit 150 identifies the respective coordinates of four corners of a frame image. Thus, the display requirement determination unit 164 extracts corresponding comment data in reference to setting position information included in all comment data. As shown in FIG. 9, when the display image is the entire image, the respective two-dimensional coordinates of all comment data are included in the display image. Thus, the display requirement determination unit 164 determines that all the comment data satisfies the first requirement.

An explanation is then given regarding a process of determining the second requirement. The display requirement determination unit 164 determines whether the scaling factor of a display image generated by the display image generation unit 150 and either a scaling factor or information related to the scaling factor included in comment data that satisfies the first requirement are in a predetermined relationship. The predetermined relationship means a relationship that satisfies the above (requirement a) in terms of the generation of a comment image. In other words, the display requirement determination unit 164 determines whether or not the scaling factor of the display image is included in a range defined by a lower limit and an upper limit that are set based on a scaling factor scl in the setting position information. The display requirement determination unit 164 acquires a scaling factor SCALE of the display image from the display image generation unit 150 and obtains the upper limit and the lower limit from the scaling factor scl in the setting position information by calculation, thereby checking whether or not the scaling factor SCALE is in a comment display area.

For example, if the scaling factor SCALE of the entire image shown in FIG. 9 is $\frac{1}{64}(=0.015625)$, only the comment data for ID 4 satisfies the requirement a, and other comment data does not satisfy the requirement a. The display requirement determination unit 164 determines whether comment data that satisfies the first requirement satisfies other requirements b and c. In the case where the entire image shown in FIG. 9 is displayed, the respective comment data items for IDs 1-3 and 5-7 satisfy the requirement b. The display requirement determination unit 164 determines whether comment data that further satisfies the requirement b satisfies either the requirement f or the requirement g. In this case, the respective comment data items for ID 1 and ID 5 satisfy the requirement f, and the comment data item for ID 7 satisfies the requirement g. For a plurality of comment data items (ID 2, ID 3, and ID 6) for which a link is provided to one another, determination regarding the requirements f and g does not need to be performed. The display requirement determination unit 164 provides this determination result to the superimposition image generation unit 166.

Based on comment data, the superimposition image generation unit 166 generates a superimposition image to be displayed on the display image. When a determination result indicating that the comment data item for ID 4 satisfies the requirement a is provided by the display requirement determination unit 164, the comment image generation unit 168 generates a comment image using display information included in the comment data item for ID 4. In FIG. 9, the comment image 228 is generated based on the comment data for ID 4 (see FIG. 10). The comment image 228 includes a user name, which is included in the comment data, and display information. This allows the contents of a comment to be viewed along with the user name. The creation date and time may be included in the comment image 228.

When a determination result indicating that the respective comment data items for IDs 1-3 and 5-7 satisfy the requirement b is provided by the display requirement determination unit 164, the icon generation unit 170 generates mark images (icon images) for informing the existence of display information. The icon generation unit 170 determines the respective display modes of the icon images according to relationships between the scaling factor SCALE of the display image and respective scaling factors scl included in the comment data items at this time. More specifically, the icon generation unit 170 colors, with blue color, the icon images of the respective comment data items for ID 1 and ID 5, which satisfy the requirement f, and colors, with red color, the icon image of the comment data item for ID 7, which satisfies the requirement g. During the enlargement of a display image, a blue icon image indicates that a comment image will be displayed soon, and a red icon image indicates that a comment image will not be reached yet. In the case when a red icon image is displayed, enlargement of a display image will turn the icon image into blue, and further enlargement of the display image will start displaying a comment image.

Since the entire image shown in FIG. 9 is an initial image, there is no comment data that satisfies the requirement c. However, if the enlargement is continued even after a comment image is displayed, the requirement c will be satisfied, and the superimposition image generation unit 166 will not perform the generation of a superimposition image.

If the comment image generation unit 168 generates a comment image while the scaling factor of the display image is included in a comment display range, the display processing unit 44 performs alpha blending of the display image generated by the display image generation unit 150 and the comment image. At this time, the display processing unit 44 obtains $\alpha$ in accordance with a relationship shown in FIG. 12 and synthesizes the display image and the comment image. The display processing unit 44 sets the coefficient $\alpha$ to be 1 when the scaling factor is from the lower limit ($\frac{1}{2}$*scl) to a predetermined value and sets the coefficient $\alpha$ to be from 1 to 0 when the scaling factor is from the predetermined value to the upper limit (2*scl). With this, an effect can be achieved that allows a comment to gradually disappear when the scaling factor exceeds the predetermined value during the enlargement of the display image. In an example shown in FIG. 12, the predetermined value is set to be scl. Alternatively, the predetermined value may be set to a scaling factor that is larger than scl.

Figure 14:
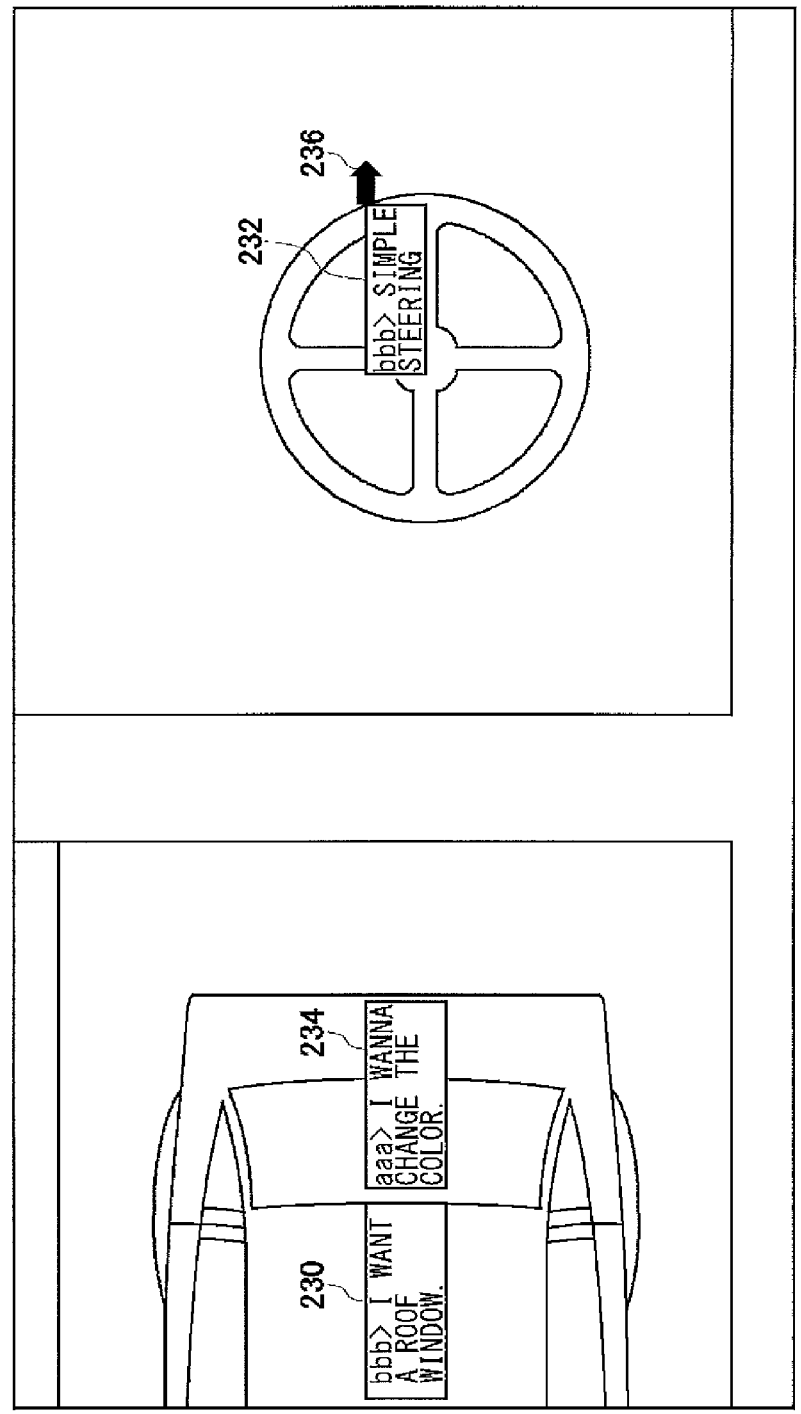
FIG. 14 is a diagram illustrating an example of a display image obtained by enlarging an initial image.

FIG. 14 illustrates an example of a display image obtained by enlarging the initial image. The display image shown in FIG. 14 is generated by enlarging the initial image while moving downward on the initial image. It is assumed that the scaling factor SCALE of the display image at this time is 0.06. It is also assumed that the display requirement determination unit 164 has determined that two-dimensional coordinates of the respective comment data items for ID 1 through ID 3, ID 5, and ID 6 are included in the display image (the first requirement is satisfied).

The display requirement determination unit 164 then checks whether the second requirement is satisfied. Scaling factors in the respective setting position information items for ID 1, ID 2, and ID 5 are 0.06, 0.0625, and 0.05, respectively, and the scaling factor SCALE is 0.06. Thus, the respective comment data items for ID 1, ID 2, and ID 5 are determined to satisfy the requirement a. Scaling factors in the respective setting position information items for ID 3 and ID 6 are 0.25 and 0.25, respectively. Thus, the respective comment data items for ID 3 and ID 6 are determined to satisfy the requirement b. The display requirement determination unit 164 provides this determination result to the superimposition image generation unit 166.

Based on comment data, the superimposition image generation unit 166 generates a superimposition image to be displayed on the display image. When a determination result indicating that the respective comment data items for ID 1, ID 2, and ID 5 satisfy the requirement a is provided by the display requirement determination unit 164, the comment image generation unit 168 generates comment images using display information included in the respective comment data items for ID 1, ID 2, and ID 5. In FIG. 14, comment images 230, 232, and 234 are generated based on the respective comment data items for ID 1, ID 2, and ID 5, respectively. The comment images 230, 232, and 234 include respective user names, which are included in the respective comment data items, and respective display information items. This allows the contents of comments to be viewed along with the user names.

If the comment image generation unit 168 generates a comment image, the display processing unit 44 performs alpha blending of the display image generated by the display image generation unit 150 and the comment images. The display processing unit 44 obtains α in accordance with the relationship shown in FIG. 12 and synthesizes the display image and the comment images. When a scaling factor in setting position information is scl, the display processing unit 44 sets the coefficient α to be 1 when the scaling factor SCALE is from the lower limit (½*scl) to a predetermined value scl and sets the coefficient α to be from 1 to 0 when the scaling factor SCALE is from the predetermined value scl to the upper limit (2*scl). Therefore, alpha blending is performed on the respective comment images 230 and 232 for ID 1 and ID 2 using the coefficient α=1. On the other hand, alpha blending is performed on the comment image 234 for ID 5 using the coefficient α=0.8. Therefore, the comment image 234 will be displayed in a state where the comment image 234 is slightly faded.

Links are provided to the comment image 232 generated based on the comment data item for ID 2, and other comment data items are associated with the comment image 232. Referring to FIG. 10, the comment data item for ID 2 is generated by a user bbb. The comment data item for ID 3 generated by the user bbb and the comment data item for ID 6 generated by a user aaa are associated to this comment data item. Therefore, the icon generation unit 170 generates an indicator 236 for indicating the existence of comments that are associated and arranges the indicator 236 near the comment image 232. An indicator 236 has a function of causing, when selected by a user, to jump to a comment image to which a link is provided. A right-pointing indicator 236 indicates that there is a comment that is newer than a comment being displayed.

When the indicator 236 is selected, the superimposition processing unit 162 extracts link information for a specified indicator 236 in reference to the comment data stored in the main memory 60. When the indicator 236 displayed near the comment image 232 for ID 2 is selected, the superimposition processing unit 162 extracts link information in the comment data item for ID 2. This link information specifies the respective comment data items for ID 3 and ID 6 (see FIG. 10). Among the two comment data items, the superimposition processing unit 162 selects, for example, the comment data item for ID 3 that has old creation date and time. The superimposition processing unit 162 provides, to the display image generation unit 150, setting position information in the comment data item for ID 3 so that the display image generation unit 150 generates a display image and so that the comment image generation unit 168 generates a comment image for ID 3. This allows the comment image for ID 3 to be displayed.

Figure 15:
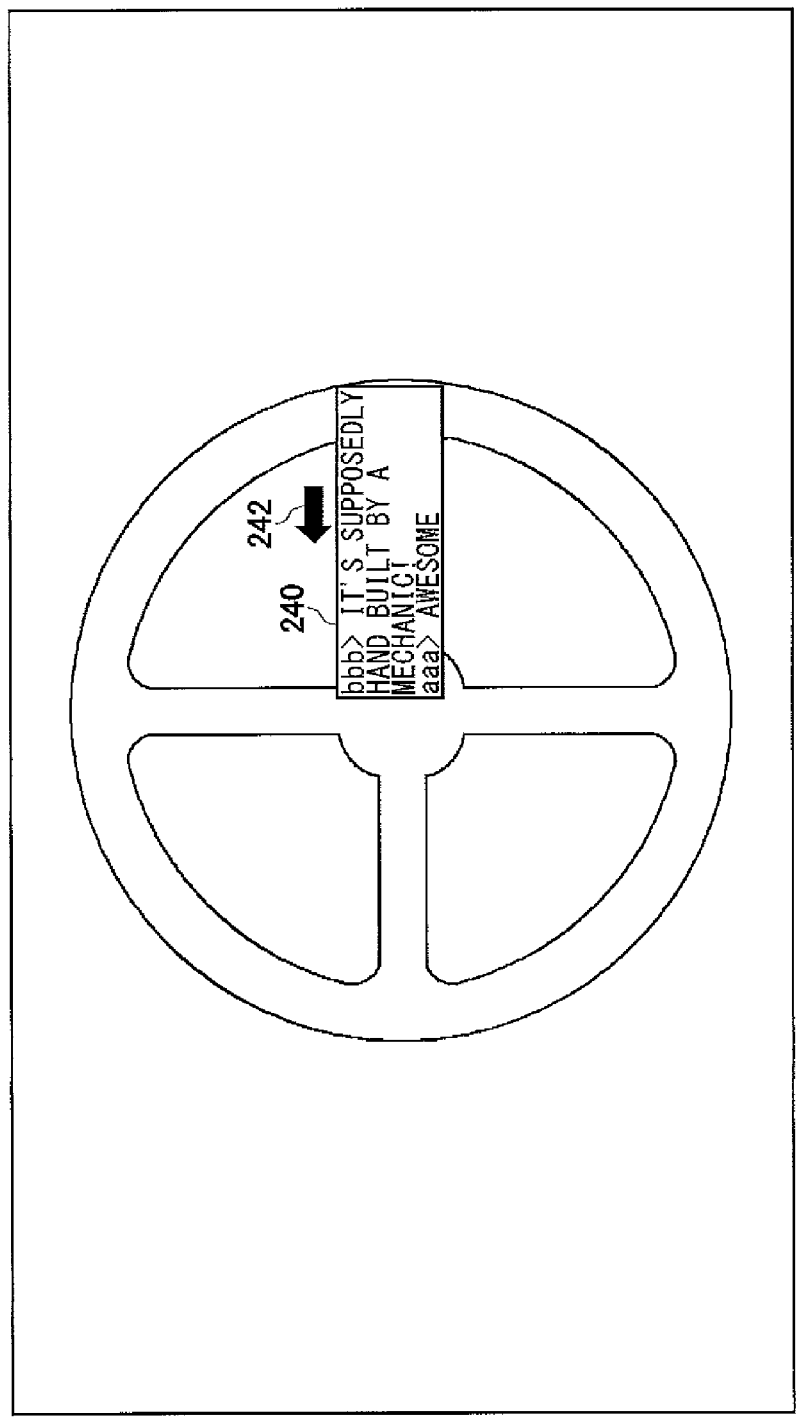
FIG. 15 is a diagram illustrating an example of a display image including a comment image.

FIG. 15 illustrates an example of a display image that includes the comment image for ID 3. Referring to FIG. 10, since respective setting position information items in the comment data item for ID 3 and the comment data item for ID 6 are the same, a comment image for ID 6 is always displayed when the comment image for ID 3 is displayed. As will hereinafter be described, this is because the user aaa has added a comment in such a way that the user aaa's comment responds to a comment of the user bbb, and the setting position information in the comment data (ID 6) of the user aaa therefore becomes the same as the setting position information in the comment data (ID 3) of the user bbb. In such a case, the comment image generation unit 168 generates a comment image in which two comments are arranged in a single display area. The comment data item of ID 3 and the comment data item of ID 6 are associated with the comment data item of ID 2. Thus, the icon generation unit 170 generates an indicator 242 and arranges the indicator 242 near a comment image 240. A left-pointing indicator 242 indicates that there is a comment that is older than a comment being displayed.

In the comment image 240, two comments are displayed side by side. Alternatively, the comment image generation unit 168 may generate separate comment images. A plurality of comments included in a single display area allows a user to become aware that there is some connection among the comments. Thus, including a plurality of comments in a single display area is more effective than generating comment images separately.

Figure 16:
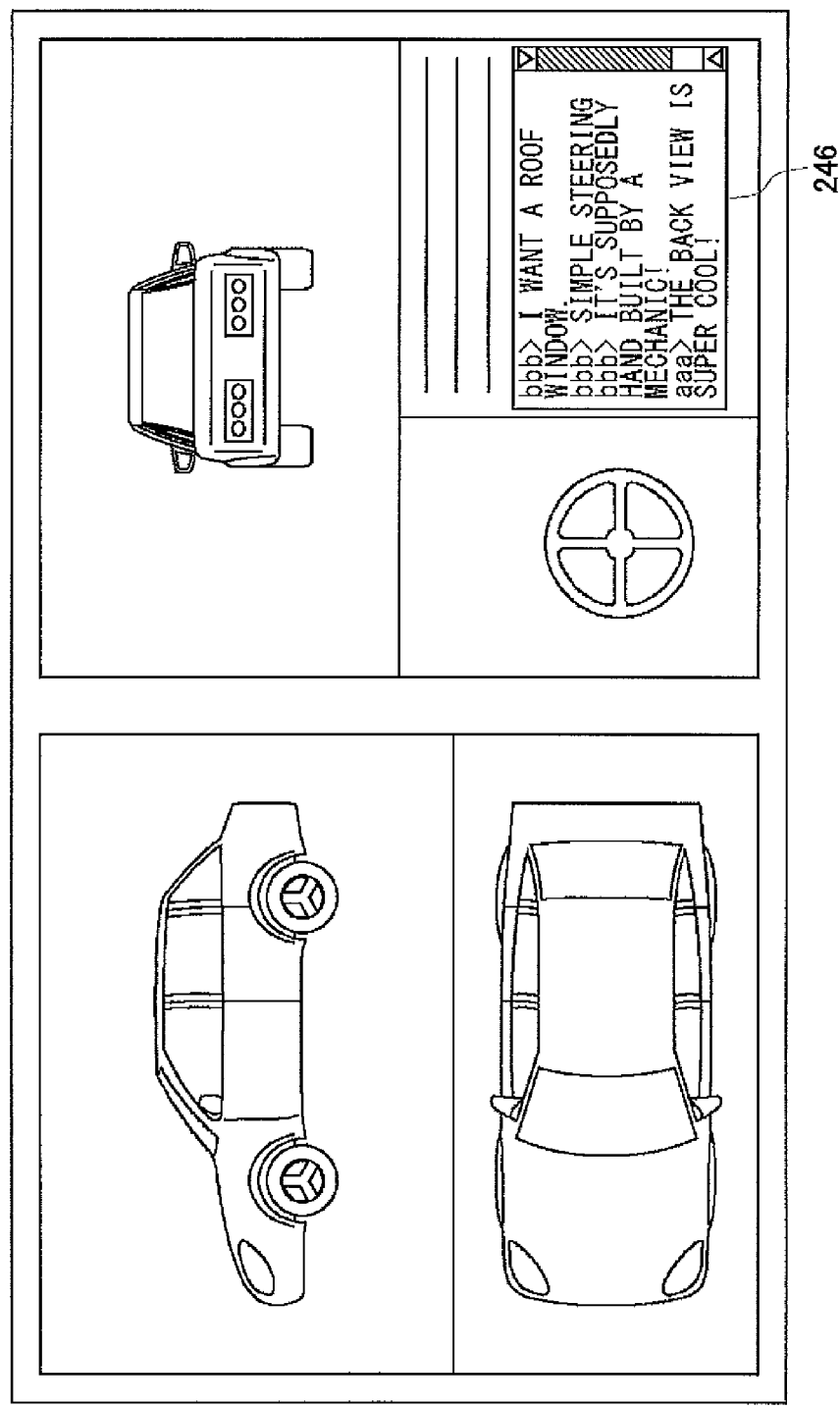
FIG. 16 is a diagram illustrating an example for displaying comments in a list format.

FIG. 16 illustrates an example for displaying comments in a list format. The comment image generation unit 168 generates a comment image 246 in which comments are arranged from the top in chronological order of creation date and time. In this case, a mechanism is preferably prepared in advance that can cause to jump, when a user selects a comment, to a display image shown at the time the comment is added based on the setting position information thereof. The jumping mechanism is as described above.

Figure 17:
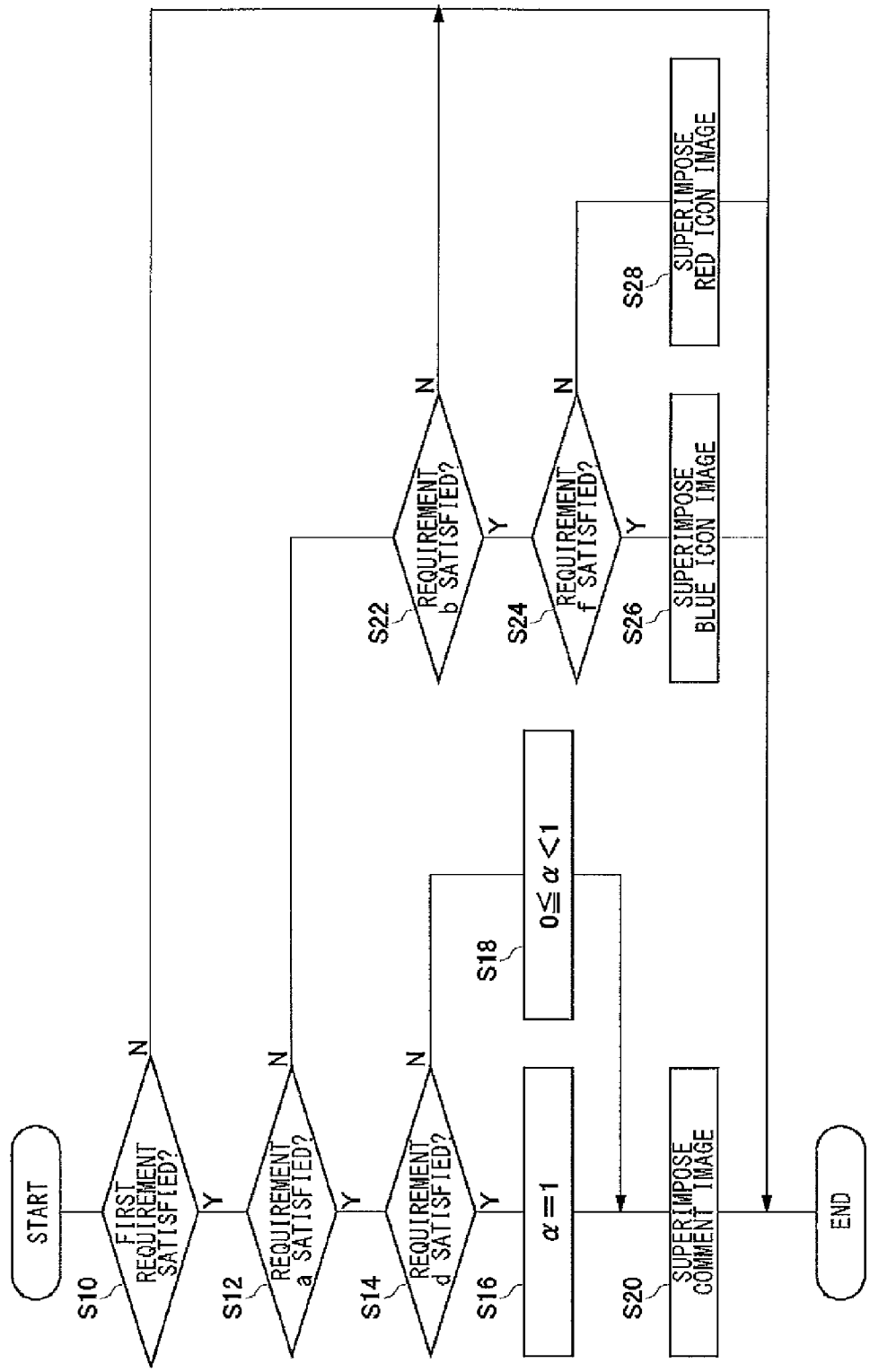
FIG. 17 is a diagram illustrating a flowchart for display control over a superimposition image.

FIG. 17 illustrates a flowchart for display control of a superimposition image. A flowchart shown in FIG. 17 displays a processing procedure performed by each component by a combination of "S" (initial letter of Step), which represents "step", and a number. In the case where some sort of a determination process is performed in a process displayed by a combination of "S" and a number, the processing procedure is displayed while adding a letter "Y" (initial letter of Yes), for example, (Y in S10) when a determination result is positive, and the processing procedure is displayed while adding a letter "N" (initial letter of No), for example, (N in S10) when the determination result is negative. This flow is performed for each comment data item every time a process of changing a display image is performed.

The display requirement determination unit 164 determines whether two-dimensional coordinates of comment data are included in a display image (S10). If the two-dimensional coordinates are not included in the display image (N in S10), the display control over the comment data is ended. If the two-dimensional coordinates are included in the display image (Y in S10), the display requirement determination unit 164 determines whether the scaling factor of the display image is included in a range defined by a lower limit and an upper limit that are set based on the scaling factor of the comment data (S12).

If the scaling factor of the display image is included in a comment display range (Y in S12), the display requirement determination unit 164 determines whether the scaling factor of the display image exists between the lower limit and a predetermined value (S14). If the scaling factor exists between the lower limit and the predetermined value (Y in S14), the display processing unit 44 sets α to be 1 (S16) and superimposes a comment image over the display image (S20). On the other hand, if the scaling factor of the display image exists between the predetermined value and the upper limit (N in S14), the display processing unit 44 sets α to be from 1 to 0 (S18) and performs alpha blending of the comment image and the display image (S20).

If the scaling factor of the display image is not included in the comment display range (N in S12), the display requirement determination unit 164 determines whether the scaling factor of the display image is smaller than the lower limit of the comment display range (S22). If the scaling factor of the display image is smaller than the lower limit (Y in S22), the display requirement determination unit 164 determines whether the scaling factor of the display image is the predetermined value or greater (S24). If the scaling factor of the display image is the predetermined value or greater (Y in S24), the display processing unit 44 superimposes a blue icon image over the display image (S26). On the other hand, if the scaling factor of the display image is smaller than the predetermined value (N in S24), the display processing unit 44 superimposes a red icon image over the display image (S28). If the scaling factor of the display image is larger than the upper limit (N in S22), the superimposition image generation unit 166 does not generate a superimposition image, and the display control over this comment data is ended. An explanation has been given regarding a flow for display control over a superimposition image based on FIG. 17. The order in which determination of each requirement is made is not limited to the order shown in FIG. 17.

Figure 18:
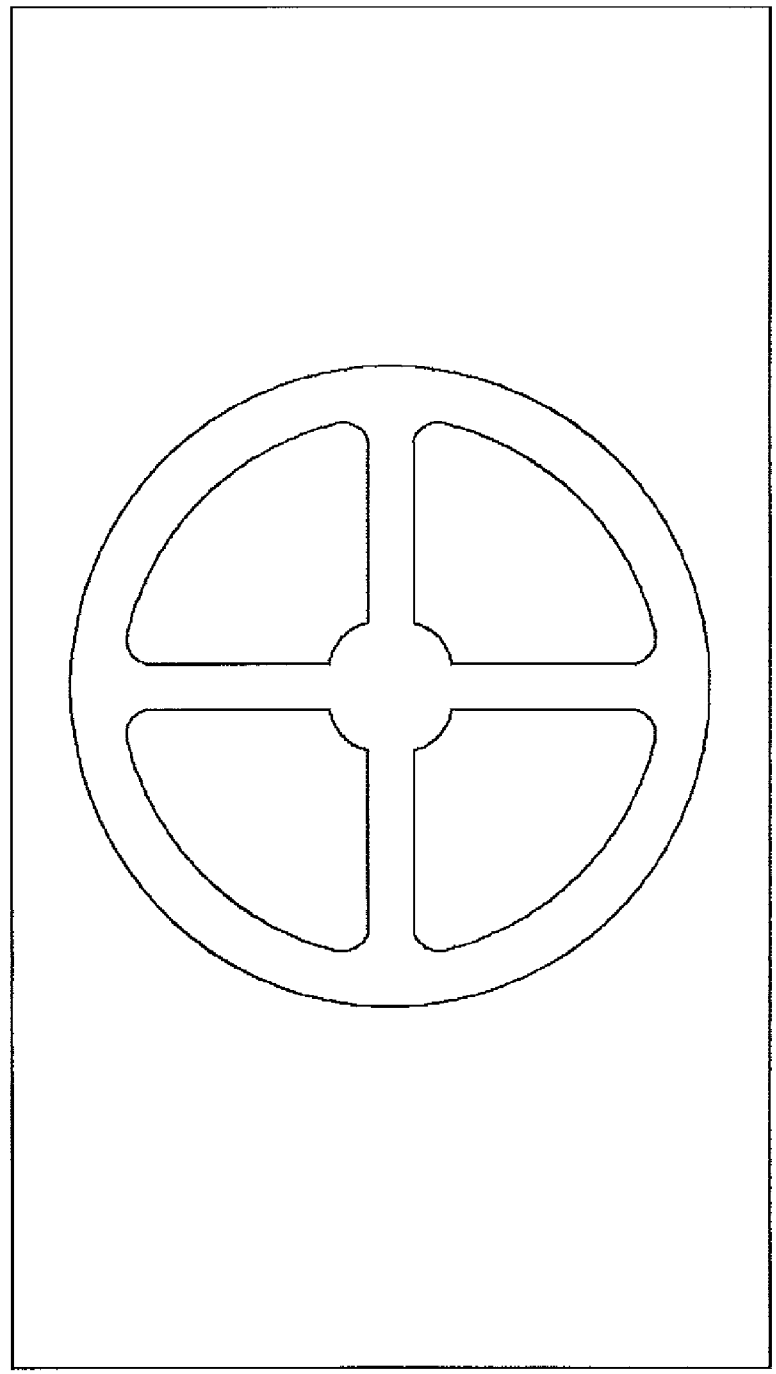
FIG. 18 is a diagram illustrating an example of a display image.

Described above is an explanation regarding the display control over comment data acquired from the accumulation server 4. An explanation regarding the generation of comment data is given in the following. In a state where a frame image is displayed on the output device 12, the comment generation instruction reception unit 114 receives an instruction for generating a comment from a user. FIG. 18 illustrates an example of a display image.

When the user presses the cross button 23 of the input device 20 on a display screen shown in FIG. 18, the comment generation instruction reception unit 114 receives an instruction for generating a comment. The instruction for generating a comment is transmitted to the comment processing unit 180, and the writing area generation unit 182 generates a comment writing area.

Figure 19:
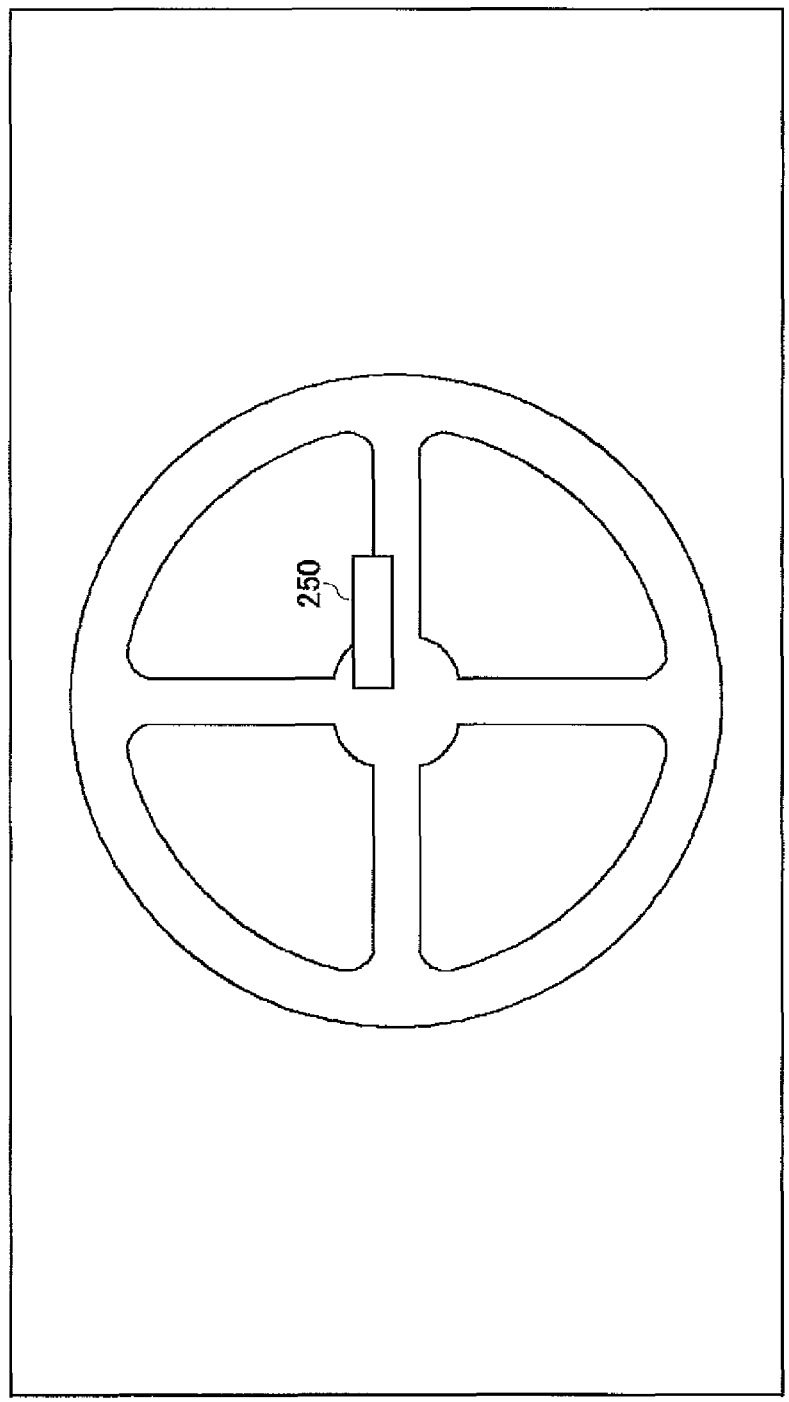
FIG. 19 is a diagram illustrating a comment writing area generated on the display image.

FIG. 19 illustrates a comment writing area 250 generated on a display image. The writing area 250 is generated, for example, in the center of the display image. When the user can move a cursor on the display image, the user can place the writing area 250 at a cursor position by moving the cursor at a position where the user desires to write a comment and then pressing the cross button 23. The user may be able to move the writing area 250 placed in the center of the display image to a desired position.

The writing area generation unit 182 generates a software keyboard on the display image so as to create an environment that allows the user to enter text. The user operates the input device 20 so as to click keys of the software keyboard and enter text. Separately from the input device 20 shown in FIG. 2, a device that allows for entry of character keys may be connected to the information processing device 10.

Figures 20, 21:
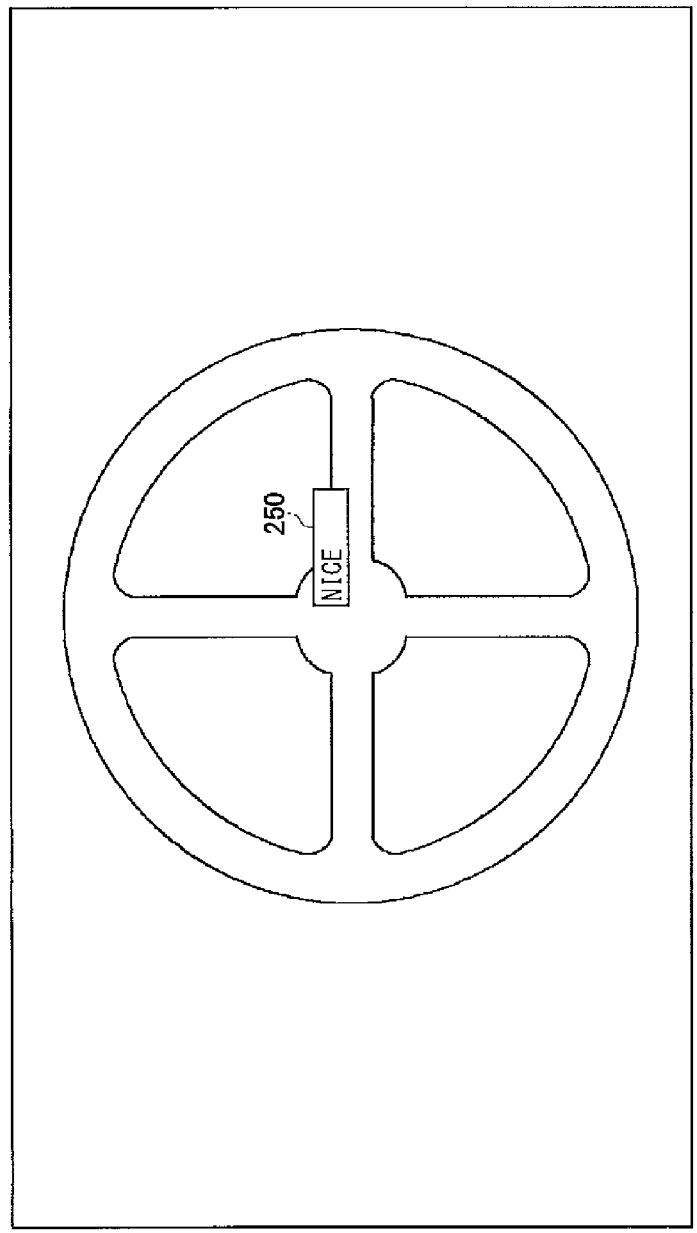
FIG. 20 is a diagram illustrating a state where a user has entered text.
FIG. 21 is a diagram illustrating an example of comment data generated by an associating unit.

FIG. 20 illustrates a state where the user has entered text. The text input reception unit 116 receives input from the user and displays the input in the writing area 250. The text input reception unit 116 provides the received input to the comment processing unit 180. The comment processing unit 180 processes input received in the text input reception unit 116. More specifically, the comment processing unit 180 performs a process of generating comment data to be transmitted to the accumulation server 4.

The position information acquisition unit 184 acquires position information that identifies a position in the display image at which the text input reception unit 116 received the input. The position information is configured to include parameters (x, y, scl), where x represents an x coordinate in a content image, where y represents a y coordinate in the content image, and where scl represents the scaling factor of the display image at the time when the comment is entered. These pieces of position information are acquired from the display image generation unit 150. The associating unit 186 associates the acquired pieces of position information to the user input so as to generate comment data.

FIG. 21 illustrates an example of comment data generated by the associating unit 186. Comment data shown in FIG. 21 is data that is transmitted from the information processing device 10 to the accumulation server 4 and comprises items for a user name, a creation date and time, input information, and position information.

A user name represent information for identifying a user who has created a comment. A creation date and time represent information for identifying the creation date and time when a comment has been created. Input information indicates text (comment) entered by the user. In the figure, an example is shown where the input information represents a comment entered by the user in a text format. Alternatively, the input information may represent, for example, a photo image, a character image, or the like. Position information represents information for identifying position information for a position at which a comment has been entered in the virtual three-dimensional space formed by the hierarchical data. The transmitter 130 transmits the generated comment data to the accumulation server 4 along with a content ID.

In comparison with the comment data shown in FIG. 10, the input information shown in FIG. 21 corresponds to the display information shown in FIG. 10, and the position information shown in FIG. 21 corresponds to the setting position information shown in FIG. 10. Upon receiving the comment data shown in FIG. 10, the accumulation server 4 assigns an ID in accordance with a creation date and time.

FIG. 20 shows an example where text is entered in the writing area 250 under a state where a comment from another user is not displayed. Alternatively, the user can also enter a comment on the display image shown in FIG. 15.

In the display image shown in FIG. 15, the comment image 240 is superimposed on the display image. When the user selects the comment image 240 and presses the cross button 23 by operating the input device 20, the writing area generation unit 182 generates a writing area 250 on the comment image 240. At this time, the writing area generation unit 182 determines to associate a comment that is entered with the comment image 240 and notifies the associating unit 186 accordingly. In response to this, the associating unit 186 adds link information and generates comment data. This allows the accumulation server 4 to recognize that received comment data is associated with other comment data and thus to generate the comment data shown in FIG. 10.

The accumulation server 4 may set link information in reference to the position information shown in FIG. 21. The position information shown in FIG. 21 is the same as the respective setting position information items for ID 3 and ID 6 shown in FIG. 10. In such a case, the comment data shown in FIG. 21 is determined to be associated with the respective comment data items for ID 3 and ID 6. This allows the accumulation server 4 to recognize that the received comment data is associated with other comment data.

In the comment data shown in FIG. 10, a link is provided between the comment data item for ID 2 and the comment data item for ID 3 that have been generated by the same user bbb. By performing an operation of explicitly associating a comment with an already-written comment at the time of writing the comment, the user bbb can associate respective comment data items of these comments with each other. For example, when the user bbb presses the triangle button 25 after writing the comment, the associating unit 186 associates the comment with a comment written in the past. If there are a plurality of comments written in the past, the associating unit 186 displays a list thereof, and the user bbb selects any one of the comments, thereby allowing for association with a selected comment.

Described above is an explanation based on the embodiments of the present invention. The above embodiments are intended to be illustrative only, and it will be obvious to those skilled in the art that various modifications to constituting elements and processes could be developed and that such modifications are also within the scope of the present invention. In the embodiments, hierarchical data is used for the generation of a display image. Alternatively, a display image may be generated, for example, by using data of a single high-resolution content image.

In the embodiments, the explanation is given on the condition that comment data and hierarchical data are separate data. Alternatively, for example, comment data that has been generated may be incorporated in hierarchical data. This provides an advantage of facilitating the management of files.

What is claimed is:

1. An information processing device, comprising:
  a reception unit configured to receive a change instruction to change a display image, which is at least a portion of a modified version of an entire image;
  a display image generation unit configured to identify, according to the change instruction, a first scaling factor for the display image, and configured to generate the display image at the first scaling factor;
  an acquisition unit configured to acquire superimposition data, which includes information for producing the display image, the superimposition data including:
    (i) superposition image data generated by a viewer of at least a portion of an initial version of the entire image while being displayed for the viewer and including at least one comment of the viewer, and
    (ii) superposition scaling data representing a second scaling factor associated with the at least a portion of the initial version of the entire image, such that the second scaling factor identifies a scale at which the at least a portion of the initial version of the entire image was displayed for the viewer at the time that the viewer generated the at least one comment for addition to the superposition image data; and
  a superimposition processing unit configured to process a superimposition image from the superimposition data after the viewer has generated the at least one comment and after the at least one comment has been added to the superposition image data, the superimposition processing unit configured to identify the second scaling factor of the at least a portion of the initial version of the entire image from the superposition scaling data, wherein the superimposition processing unit includes:
  a determination unit configured to determine whether the first scaling factor of the display image and the second scaling factor of the at least a portion of the initial version of the entire image from the superimposition scaling data are in a predetermined relationship, where the predetermined relationship includes that the first scaling factor is within a range defined by a lower limit and an upper limit that are dependent on the second scaling factor; and
  a superimposition image generation unit configured to generate the superimposition image to be included in the at least a portion of the initial version of the entire image to produce the display image, based on the determination such that the at least one comment of the viewer is only included in the display image and only visible in the display image when the first scaling factor and the second scaling factor are in the predetermined relationship.

2. The information processing device according to claim 1,
  wherein the superimposition data includes two-dimensional coordinates within the initial version of the entire image at which the at least a portion of the initial version of the entire image is located, and
  wherein the determination unit is configured to determine whether the two-dimensional coordinates included in the superimposition data indicate that the at least a portion of the initial version of the entire image is included within the display image.

3. The information processing device according to claim 1,
  wherein the superimposition data includes display information, and
  wherein, when the determination unit determines that the first scaling factor of the display image and the second scaling factor of the at least a portion of the initial version of the entire image from the superposition scaling data are in the predetermined relationship, the superimposition image generation unit generates the superimposition image using the display information included in the superimposition data.

4. The information processing device according to claim 1, wherein a difference between the second scaling factor and the upper limit of the range is substantially equal to a difference between the second scaling factor and the lower limit of the range.

5. The information processing device according to claim 4, further comprising a display processing unit configured to perform alpha blending of the superimposition image to produce the display image when the first scaling factor of the display image is included in the range.

6. The information processing device according to claim 5, wherein the display processing unit sets a coefficient α to be 1 when the first scaling factor of the display image is from the lower limit to a predetermined value and sets the coefficient α to be from 1 to 0 when the first scaling factor of the display image is from the predetermined value to the upper limit.

7. The information processing device according to claim 4, wherein, when the determination unit determines that the first scaling factor of the display image is smaller than the lower limit, the superimposition image generation unit generates a mark image in the display image for informing the existence of the display information without displaying the display information in the display image.

8. The information processing device according to claim 7, wherein the superimposition image generation unit is configured to determine a display mode of the mark image according to a relationship between the first scaling factor of the display image and the second scaling factor for the at least a portion of the initial version of the entire image from the from the superposition scaling data.

9. The information processing device according to claim 4, wherein, when the determination unit determines that the first scaling factor of the display image is larger than the upper limit, the superimposition image generation unit does not include the superimposition image in the at least a portion of the initial version of the entire image to produce the display image.

10. A processor operating under the control of a computer program, which causes the processor to operate as an information processing device, the information processing device comprising:
   a reception unit configured to receive a change instruction to change a display image, which is at least a portion of a modified version of an entire image;
   a display image generation unit configured to identify, according to the change instruction, a first scaling factor for the display image, and configured to generate the display image at the first scaling factor;
   an acquisition unit configured to acquire superimposition data, which includes information for producing the display image, the superimposition data including:
      (i) superposition image data generated by a viewer of at least a portion of an initial version of the entire image while being displayed for the viewer and including at least one comment of the viewer, and
      (ii) superposition scaling data representing a second scaling factor associated with the at least a portion of the initial version of the entire image, such that the second scaling factor identifies a scale at which the at least a portion of the initial version of the entire image was displayed for the viewer at the time that the viewer generated the at least one comment for addition to the superposition image data; and
   a superimposition processing unit configured to process a superimposition image from the superimposition data after the viewer has generated the at least one comment and after the at least one comment has been added to the superposition image data, the superimposition processing unit configured to identify the second scaling factor of the at least a portion of the initial version of the entire image from the superposition scaling data, wherein the superimposition processing unit includes:
   a determination unit configured to determine whether the first scaling factor of the display image and the second scaling factor of the at least a portion of the initial version of the entire image from the superimposition scaling data are in a predetermined relationship, where the predetermined relationship includes that the first scaling factor is within a range defined by a lower limit and an upper limit that are dependent on the second scaling factor; and
   a superimposition image generation unit configured to generate the superimposition image to be included in the at least a portion of the initial version of the entire image to produce the display image, based on the determination such that the at least one comment of the viewer is only included in the display image and only visible in the display image when the first scaling factor and the second scaling factor are in the predetermined relationship.

11. The processor according to claim 10, wherein the change instruction is given to instruct to enlarge, reduce, or move the display image.

12. A non-transitory computer-readable recording medium containing a computer program adapted to cause a computer to implement a function of displaying a display image, the computer program comprising:
   a module configured to receive a change instruction to change a display image, which is at least a portion of a modified version of an entire image;
   a module configured to identify, according to the change instruction, a first scaling factor for the display image, and configured to generate the display image at the first scaling factor;
   a module configured to acquire superimposition data, which includes information for producing the display image, the superimposition data including:
      (i) superposition image data generated by a viewer of at least a portion of an initial version of the entire image while being displayed for the viewer and including at least one comment of the viewer, and
      (ii) superposition scaling data representing a second scaling factor associated with the at least a portion of the initial version of the entire image, such that the second scaling factor identifies a scale at which the at least a portion of the initial version of the entire image was displayed for the viewer at the time that the viewer generated the at least one comment for addition to the superposition image data; and
   a module configured to process a superimposition image from the superimposition data after the viewer has generated the at least one comment and after the at least one comment has been added to the superposition image data, the superimposition processing unit configured to identify the second scaling factor of the at least a portion of the initial version of the entire image from the superposition scaling data;
   a module configured to determine whether the first scaling factor of the display image and the second scaling factor of the at least a portion of the initial version of the entire image from the superimposition scaling data are in a predetermined relationship, where the predetermined relationship includes that the first scaling factor is within a range defined by a lower limit and an upper limit that are dependent on the second scaling factor; and
   a module configured to generate the superimposition image to be included in the at least a portion of the initial version of the entire image to produce the display image, based on the determination such that the at least one comment of the viewer is only included in the display image and only visible in the display image when the first scaling factor and the second scaling factor are in the predetermined relationship.

* * * * *